(12) United States Patent
Funakubo

(10) Patent No.: US 7,421,288 B2
(45) Date of Patent: Sep. 2, 2008

(54) MULTI-ANTENNA SYSTEM AND ANTENNA UNIT

(75) Inventor: Toshiaki Funakubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 342 days.

(21) Appl. No.: 11/199,854

(22) Filed: Aug. 9, 2005

(65) Prior Publication Data
US 2005/0266888 A1    Dec. 1, 2005

Related U.S. Application Data

(63) Continuation of application No. PCT/JP03/05612, filed on May 2, 2003.

(51) Int. Cl.
*H04M 1/00* (2006.01)

(52) U.S. Cl. ................. 455/562.1; 455/277.1

(58) Field of Classification Search ........... None
See application file for complete search history.

(56) References Cited

U.S. PATENT DOCUMENTS

2004/0110538 A1* 6/2004 Doi ................... 455/562.1
2004/0152490 A1* 8/2004 Aoyama et al. ......... 455/560

FOREIGN PATENT DOCUMENTS

| JP | 62-214743 | 9/1987 |
|---|---|---|
| JP | 8-505503 | 6/1996 |
| WO | WO 92/10890 | 6/1992 |

* cited by examiner

*Primary Examiner*—Thanh C Le
(74) *Attorney, Agent, or Firm*—Katten Muchin Rosenman LLP

(57) ABSTRACT

A multi-antenna system comprising a plurality of linearly connected antenna units, and a base station device connected to at least one of the antenna units. The antenna units connected in a first direction or a second direction are combined to constitute a multi antenna. The multi-antenna system comprises a unit addition unit that adds one unit to number-of-connected-antenna-units information which is input from the first direction; a number-of-connections sending unit that sends the number-of-connected-antenna-units information, to which one unit has been added as described above, as the number-of-connected-antenna-units information in the second direction; a received data addition unit that adds input digital data, which is input from the first direction, to received digital data; an added-digital-data sending unit that sends the digital data, to which input digital data has been added, as input digital data in the second direction; and a transmission data sending unit that copies the transmission digital data, which is input from the second direction, and sends the copied digital data in the first direction.

12 Claims, 22 Drawing Sheets

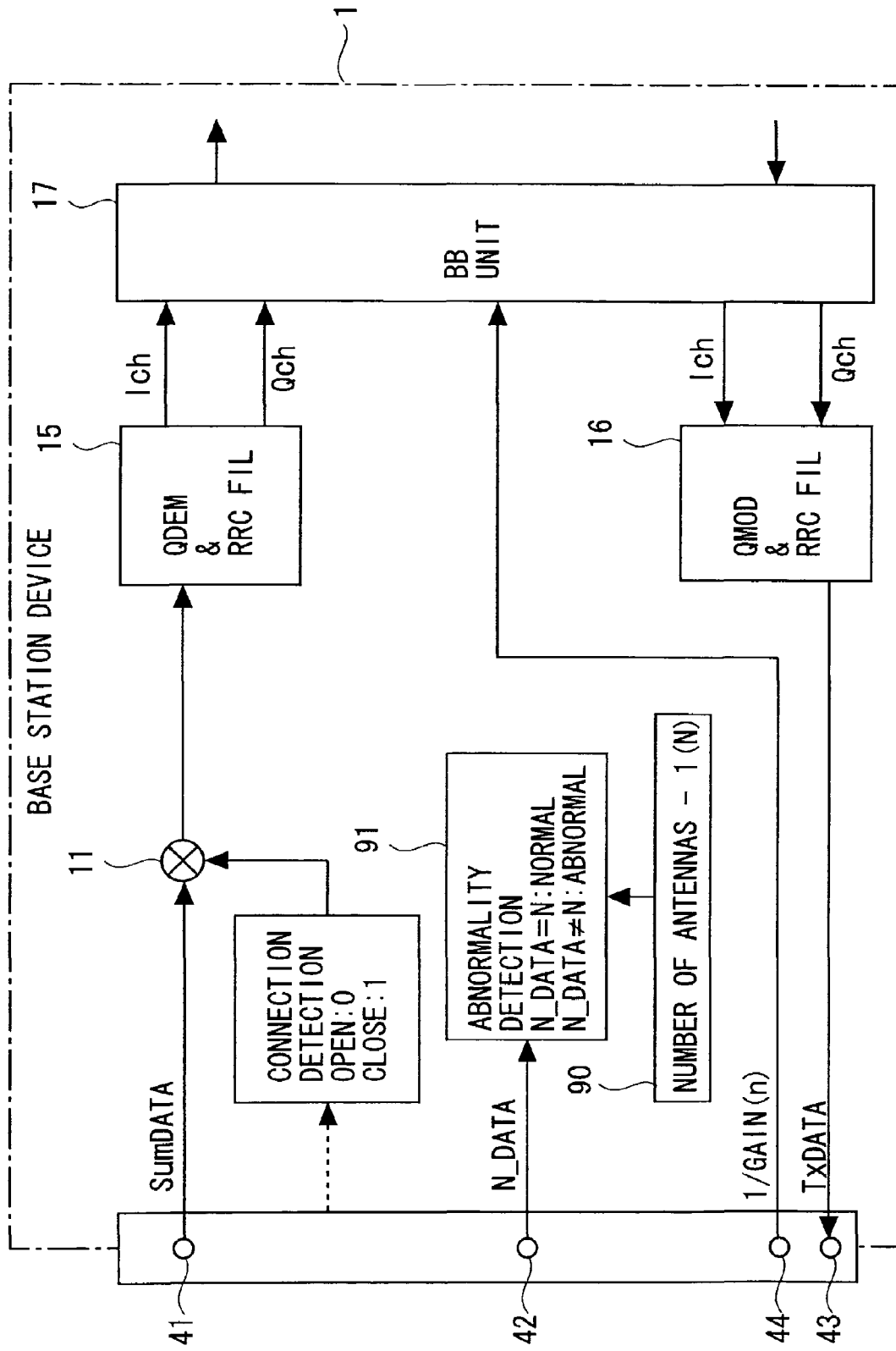

MULTI-ANTENNA SYSTEM AND ANTENNA UNIT

CROSS-REFERENCE TO RELATED APPLICATION

This is a continuation of International Application PCT/JP2003/005612, filed on May 2, 2003. The disclosures of International Application PCT/JP2003/005612 including the specification, drawings and abstract are incorporated herein by reference.

BACKGROUND OF THE INVENTION

1. Technical Field

The present invention relates to a radio communication base station.

2. Background Art

A wide-ranging communication enable area is required in mobile communication services for cellular phones or the like. In a building or an underground shopping center, however, an electromagnetic wave reaching distance becomes extremely short because of a structure of a building. Thus, an electromagnetic wave dead zone is easily created.

In such a place, to reduce the dead zone of mobile communication, generally, many base stations or antennas must be installed (e.g., refer to Patent Document 1).

FIG. 1 is a diagram showing a conventional method of covering a dead zone. As shown in FIG. 1, a configuration of a conventional example uses abase station device 301 of CDMA (Code Division Multiple Access) or the like, a duplexer (DUP) for transmitting transmission signals input to/output from the base station device 301 by sharing one path, a plurality of adding/branching filters (H) for synthesizing or branching the transmission signals input/output by the duplexer (DUP), and a plurality of antennas 302 connected to the plurality of hierarchically connected adding/branching filters (H).

First, the duplexer (DUP) combines radio signals input to/output from the base station device 301 through one high-frequency cable. Next, the radio signals are multiple-branched through the adding/branching filters (H), and connected to the plurality of antennas 302. Conventionally, dead zones have been reduced by installing the antennas 302 in the different dead zones. In another conventional example, dead zones have been reduced by individually installing compact base station devices in the dead zones.

However, according to the method shown in FIG. 1, power of the radio signals is reduced by the adding/branching filters (H) in proportion to the number of branches. To compensate for the reduction in power, extremely large power supply has been necessary for the base station device 301.

Additionally, for example, there is a loss in the midway of a path from the base station device 301 to the antenna 302. Thus, large transmission power supplied from the base station device 301 has directly caused a large power loss.

Furthermore, according to the method of individually installing the base station devices 301 in the deal zones, a modulation/demodulation unit, a base band unit, a common unit, or the like relatively large in circuit size and power consumption must be installed in each dead zone. Thus, with this configuration, the system has become extremely large as compared with the configuration of FIG. 1.

Patent Document 1
JP 08-505503 A

SUMMARY OF THE INVENTION

The present invention has been developed in view of the aforementioned conventional technical problems. That is, an object of the present invention is to provide a technology capable of inexpensively reducing dead zones by branching radio signals input to/output from one base station to a plurality of antennas with small power losses or collecting radio signals from the plurality of antennas, and capable of miniaturizing a system.

In order to solve the above problems, the present invention adopts the following means. That is, according to the present invention, there is provided a multi-antenna system including a plurality of linearly connected antenna units, and a base station device connected to at least one of the antenna units.

Each antenna unit is combined with the other antenna units connected in a first or second direction to constitute a multi-antenna. The antenna unit includes: a unit value addition unit for adding number information of connected antenna unit input from the first direction by 1 unit; a connected number sending unit for sending the number information of connected antenna unit having the 1 unit added thereto as number information of connected antenna unit in the second direction; a transmission/reception module for transmitting/receiving a radio signal; an analog digital conversion unit for converting the radio signal received from the transmission/reception module into reception digital data; a reception data addition unit for adding together input digital data input from the first direction and the reception digital data; an added digital data sending unit for sending the added digital data as input digital data in the second direction; a digital analog conversion unit for converting transmission digital data input from the second direction into a transmission analog signal; a feeding unit for feeding power of the transmission analog signal to the transmission/reception module; and a transmission data sending unit for duplicating the transmission digital data input from the second direction and sending the duplicated data in the first direction.

Thus, each antenna unit adds the number information of connected antenna unit input from the first direction by 1 unit, and sends the information in the second direction. Additionally, each antenna unit adds together the input digital data input from the first direction and the reception digital data, and sends the added data in the second direction. Thus, the number information of connected antenna unit and the reception digital data are sequentially added together, and transmitted from the first direction into the second direction.

On the other hand, the transmission digital data input from the second direction is branched by duplication. One of the branched transmission digital data is transmitted from the transmission/reception unit via the feeding unit. The other transmission digital data is transmitted in the second direction.

The base station device includes: a computing unit for generating a divided value obtained by dividing the input digital data input from the antenna unit by the number information of connected antenna units; a demodulation unit for demodulating a reception signal from the divided value; and a modulation unit for generating the transmission digital data.

This base station device divides the input digital data added together at the linearly connected antenna units by the number information of connected antenna units, and obtains average data of the reception digital data. The base station device executes demodulation processing based on this average data.

The present invention may be an antenna system which includes a plurality of antenna units, a connection unit for connecting the antenna units, and a base station device connected to at least one of connected units.

The connection unit only needs to include: first and second connected units connected to the other antenna units in the first direction; a third connected unit connected to another connection unit or the base station device in the second direction; a connected number addition unit for generating an added connected number by adding together number information of connected antenna unit input from the first connected unit and number information of connected antenna unit input from the second connected unit; a connected number sending unit for sending the added connected number as number information of connected antenna unit in the second direction; a reception data addition unit for adding together input digital data input from the first connected unit and input digital data input from the second connected unit; and an added digital data sending unit for sending the added input digital data as input digital data in the second direction.

This connection unit is connected to the other antenna units via the first and second connected units in the first direction. Additionally, the connection unit is connected to the other connection unit or the base station device via the third connected unit in the second direction.

Then, the connection unit adds together the number information of connected antenna unit input from the first connected unit and the number information of connected antenna unit input from the second connected unit, and transmits the added information in the second direction. Moreover, the connection unit adds together the input digital data input from the first connected unit and the input digital data input from the second connected unit, and sends the added data in the second direction.

With this configuration, the multi-antenna system can branch and connect the linearly connected antenna units.

Preferably, the connection unit may further include means for clearing the input digital data input from the first connected unit when another antenna unit is not connected to the first connected unit, and means for clearing the input digital data input from the second connected unit when another antenna unit is not connected to the second connected unit.

Preferably, the connection unit may further include means for clearing the number information of connected antenna units input from the first connected unit when another antenna unit is not connected to the first connected unit, and means for clearing the number information of connected antenna units input from the second connected unit when another antenna unit is not connected to the second connected unit.

Further, in the present invention, each antenna unit may include: a unit value addition unit for adding number information of connected antenna unit input from the first direction by 1 unit; a connected number sending unit for sending the number information of connected antenna unit having the 1 unit added thereto as number information of connected antenna unit in the second direction; a transmission/reception module for transmitting/receiving a radio signal; an analog digital conversion unit for converting the radio signal received from the transmission/reception module into reception digital data; a weight averaging unit for weight-averaging an average value of the reception digital data and input digital data from the first direction according to the number of antenna units connected in the first direction; an average value data sending unit for sending the weight-averaged digital data as input digital data in the second direction; a digital analog conversion unit for converting transmission digital data input from the second direction into a transmission analog signal; a feeding unit for feeding power of the transmission analog signal to the transmission/reception module; and a transmission data sending unit for duplicating the transmission digital data input from the second direction and sending the duplicated data in the first direction.

Thus, each antenna unit transmits the weight-averaged reception digital data as input digital data in the second direction. Thus, in this multi-antenna system, it is possible to suppress an increase in bit number caused by the addition of the reception digital data.

Preferably, the weight averaging unit may include: a connected number multiplication unit for generating multiplication data by multiplying the input digital data input from the first direction by the number information of connected antenna unit; a reception data addition unit for calculating added digital data by adding together the reception digital data and the multiplication data; and a computing unit for dividing the added digital data by the number information of connected antenna unit having the 1 unit added thereto.

Further, according to the present invention, there may be provided a multi-antenna system including a plurality of antenna units, and a base station device connected to at least one of the antenna units.

Each antenna unit may include: a transmission/reception module for transmitting/receiving a radio signal; a gain control amplifier for amplifying the radio signal received from the transmission/reception module by a specified gain; an analog digital conversion unit for converting the amplified radio signal into reception digital data; a digital analog conversion unit for converting transmission digital data input from the base station device into a transmission analog signal; and a feeding unit for feeding power of the transmission analog signal to the transmission/reception module.

Further, the base station device may include: a reception data addition unit for generating added digital data by adding together the input digital data input from the antenna units; a gain control unit for setting a gain of the gain control amplifier based on a signal level of the added digital data; a demodulation unit for demodulating a reception signal from the added digital data; and a modulation unit for generating the transmission digital data.

According to the multi-antenna system, the base station device controls the gain of the gain control amplifier provided in each antenna unit based on the signal level of the added digital data for demodulating the reception signal. Thus, the base station device can control an input level to the demodulation unit within a predetermined range.

Further, the gain control unit may be provided in each antenna unit instead of the base station device. That is, each antenna unit may include: a transmission/reception module for transmitting/receiving a radio signal; a gain control amplifier for amplifying the radio signal received from the transmission/reception module by a specified gain; an analog digital conversion unit for converting the amplified radio signal into reception digital data; a gain control unit for setting a gain of the gain control amplifier based on a signal level of the reception digital data; a gain sending unit for sending data regarding the gain to the base station device; a digital analog conversion unit for converting transmission digital data input from the base station device into a transmission analog signal; and a feeding unit for feeding power of the transmission analog signal to the transmission/reception module.

With this configuration, each antenna unit can control the gain according to a reception level in its own transmission/reception module. Thus, it is possible to control the signal level converted into the digital data within a predetermined range in each antenna unit.

In that case, the base station device may include: a reception data input unit for inputting the input digital data from each antenna unit; a gain data input unit for inputting the data regarding the gain from each antenna unit; a gain computing unit for dividing the input digital data by a gain of the input origin antenna unit; a reception data addition unit for generating added digital data by adding together the input digital data divided by the gain and input from the antenna units; a gain synthesis unit for synthesizing the data regarding the gain input from each antenna unit with data regarding a synthesized gain; a synthesized gain multiplication unit for multiplying the added digital data by the synthesized gain; a demodulation unit for demodulating a reception signal from the added digital data multiplied by the synthesized gain; and a modulation unit for generating the transmission digital data.

With this configuration, the base station device can synthesize the reception digital data from the antenna units by canceling a difference in gains among the antenna units.

Further, according to the present invention, there may be provided a multi-antenna system including a plurality of linearly connected antenna units, and a base station device connected to at least one of the antenna units, in which each antenna unit is combined with the other antenna units connected in a first or second direction to constitute a multi-antenna, and includes: a unit value addition unit for adding number information of connected antenna unit input from the first direction by 1 unit; a connected number sending unit for sending the number information of connected antenna unit having the 1 unit added thereto as number information of connected antenna unit in the second direction; a transmission/reception module for transmitting/receiving a radio signal; a gain control amplifier for amplifying the radio signal received from the transmission/reception module by a specified gain; an analog digital conversion unit for converting the amplified radio signal into reception digital data; a gain control unit for controlling a gain of the gain control amplifier based on a signal level of the reception digital data; a gain synthesis unit for synthesizing data regarding the gain with data regarding a synthesized gain from the first direction; a gain sending unit for sending the synthesized data as data regarding the synthesized gain in the second direction; a weight averaging unit for weight-averaging an average value of the reception digital data and input digital data from the first direction according to the number of antenna units connected in the first direction; an average digital data sending unit for sending the weight-averaged digital data as input digital data in the second direction; a digital analog conversion unit for converting transmission digital data input from the second direction into a transmission analog signal; a feeding unit for feeding power of the transmission analog signal to the transmission/reception module; and a transmission data sending unit for duplicating the transmission digital data input from the second direction and sending the duplicated data in the first direction.

Further, the weight averaging unit may include: a gain computing unit for dividing the reception digital data by the gain; a synthesized gain computing unit for dividing the input digital data input from the first direction by the synthesized gain from the first direction; a connected number multiplication unit for generating multiplication data by multiplying the input digital data divided by the synthesized gain from the first direction by the number information of connected antenna unit input from the first direction; a reception data addition unit for calculating added digital data by adding together the reception digital data divided by the gain and the multiplication data; a computing unit for dividing the added digital data by the number information of connected antenna unit having the 1 unit added thereto; and a synthesized gain multiplication unit for multiplying the divided added digital data by the data regarding the synthesized gain of the second direction.

According to the multi-antenna system, the weight averaging processing can be executed after the level of the reception signal in each transmission/reception module is controlled within the predetermined range. Thus, it is possible to further expand the dynamic range of the reception signal.

Further, according to the present invention, there may be provided a radio base station including:

means for digitally adding together reception signals of a plurality of antennas;

calculation means for calculating the number of antennas to be added by executing an arithmetic operation according to the digital added value; and reception means for receiving the calculated number of antennas.

With this configuration, the number of antennas actually used for reception can be calculated. Thus, the radio base station can determine whether the calculated number of antennas (number of operated antennas) is proper or not, for example, as compared with the originally set number of antennas.

Further, according to the present invention, there may be provided a radio base station including:

a plurality of serially connected antennas;

addition means for digitally adding together a reception signal from an antenna of a front stage and a reception signal from an own antenna and supplying the added signal to an antenna of a rear stage;

calculation means for calculating the number of added antennas; and computing means for compressing a range of a sum total of the reception signals added together by the addition means according to the calculated number of antennas.

Thus, each antenna digitally adds together the reception signals, and executes an operation of compressing a range of a sum total of the reception signals added together according to the number of antennas. This operation is, for example, a division based on the number of antennas of the sum total of the added reception signals. By this operation, the range of the sum total of the reception signals is compressed, whereby the amount of information necessary for transmitting the sum total of the reception signals can be reduced.

The present invention may be the aforementioned antenna unit. The present invention may be the aforementioned base station device. The present invention may be a method including a procedure of realizing the aforementioned functions.

As described above, according to the present invention, a radio signal input to/output from one base station can be branched to a plurality of antennas with small power losses, dead zones can be inexpensively reduced, and the system can be made more compact. In other words, for transmission from the base station, a transmission signal can be branched to a plurality of antennas and transmitted with small power losses. Moreover, in reception from the mobile station to the base station, dead zones of the mobile station can be reduced by a plurality of antennas.

Furthermore, in this case, it is possible to reduce a range of signals to be processed by calculating an average of reception signals for the plurality of antennas. Moreover, the gain of amplifying a reception signal from the antenna is controlled by the reception signal, whereby the bit number during analog digital conversion can be effectively used. By controlling the number of connected antennas, determination is made as to whether the number of antennas connected to the base station is proper or not. Thus, it is possible to determine an operation state of the system.

BRIEF DESCRIPTION OF THE DRAWINGS

FIG. 22 shows a configuration of a base station device according to the seventh embodiment.

DETAILED DESCRIPTION OF THE INVENTION

Hereinafter, best modes for carrying out the present invention will be described with reference to the accompanying drawings.

First Embodiment

Hereinafter, a radio communication base station system (simply referred to as a base station system, hereinafter) according to a first embodiment of the present invention will be described with reference to FIGS. 2 to 4. According to this embodiment, the base station system is realized by combining a plurality of signal processing units called antenna units.

CONNECTION EXAMPLE

Figure 1:
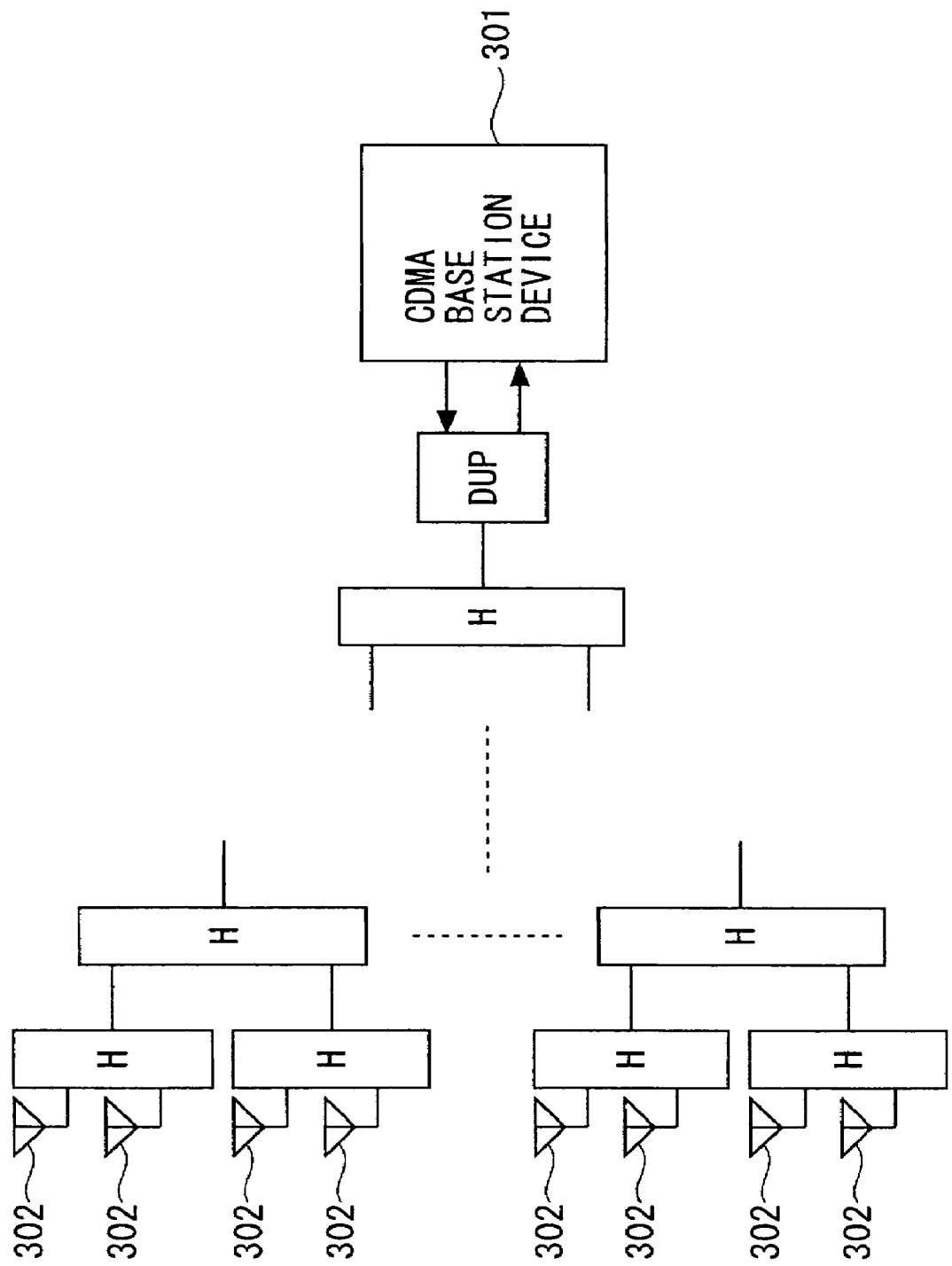
FIG. 1 is a diagram showing a conventional method of covering a dead zone.
Figure 2:
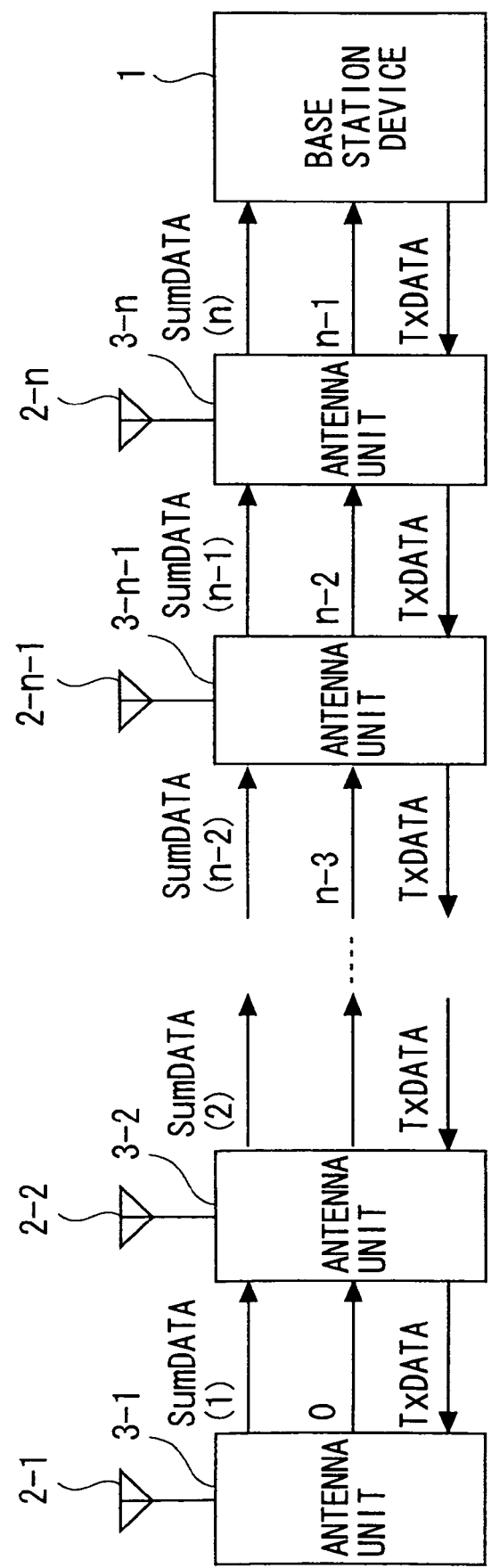
FIG. 2 shows a connection example of antenna units in a base station system according to a first embodiment.

FIG. 2 shows a connection example of the antenna units of this base station system. As shown in FIG. 2, according to this embodiment, this base station system includes a base station device 1, antenna units 3-1, 3-2, ..., 3-n (antenna units 3-1 and the like, hereinafter) linearly connected from the base station device 1, and antennas 2-1, 2-2, ..., 2-n connected to the antenna units 3-1 and the like to transmit/receive radio signals.

In FIG. 2, a direction toward the base station device 1 is called an uplink direction (equivalent to a second direction). Additionally, in FIG. 2, a direction apart from the base station device 1 is called a downlink direction (equivalent to a first direction). As shown in FIG. 2, three kinds of signals are transferred between the antenna units and between the antenna unit 3-n and the base station device 1.

A first signal is reception digital data, and indicated by SumDATA(k) (k is 1, 2, ..., n) in FIG. 2. This reception digital data is a digital added value of a signal received by the antenna 2-1 or the like.

It should be noted that in the base station system, digital addition of the received data is executed in the uplink direction. In other words, a reception signal of the antenna 2-1 is SumDATA(1), and a signal obtained by adding a reception signal of the antenna 2-2 to the SumDATA(1) is SumDATA(2).

Thereafter, similarly, a signal obtained by adding a reception signal of the antenna 2-k to SumDATA(k−1) is SumDATA(k). Then, SumDATA(n) indicates an addition result of reception signals of all the antennas 2-1 to 2-n.

A second signal is the number of connected antennas (or number of connected antenna units). As shown in FIG. 2, the number of connected antennas is also added in the uplink direction from the antenna unit 3-1. According to this embodiment, however, for the number of connected antennas, a value smaller by 1 than the real number of antennas, such as 0, 1, ..., n−1, is calculated.

A third signal is transmission digital data transmitted in the downlink direction from the base station device 1. In FIG. 2, the transmission digital data is indicated by TxDATA. Upon reception of the transmission digital data from the uplink side antenna unit 3-(k+1), each antenna unit 3-k duplicates the transmission digital data, and passes the duplicated data to the downlink side antenna unit 3-(k−1). This duplication is duplication of the digital data, no loss occurs, and no signal degradation occurs.

<Configuration of Antenna Unit>

Figure 3:
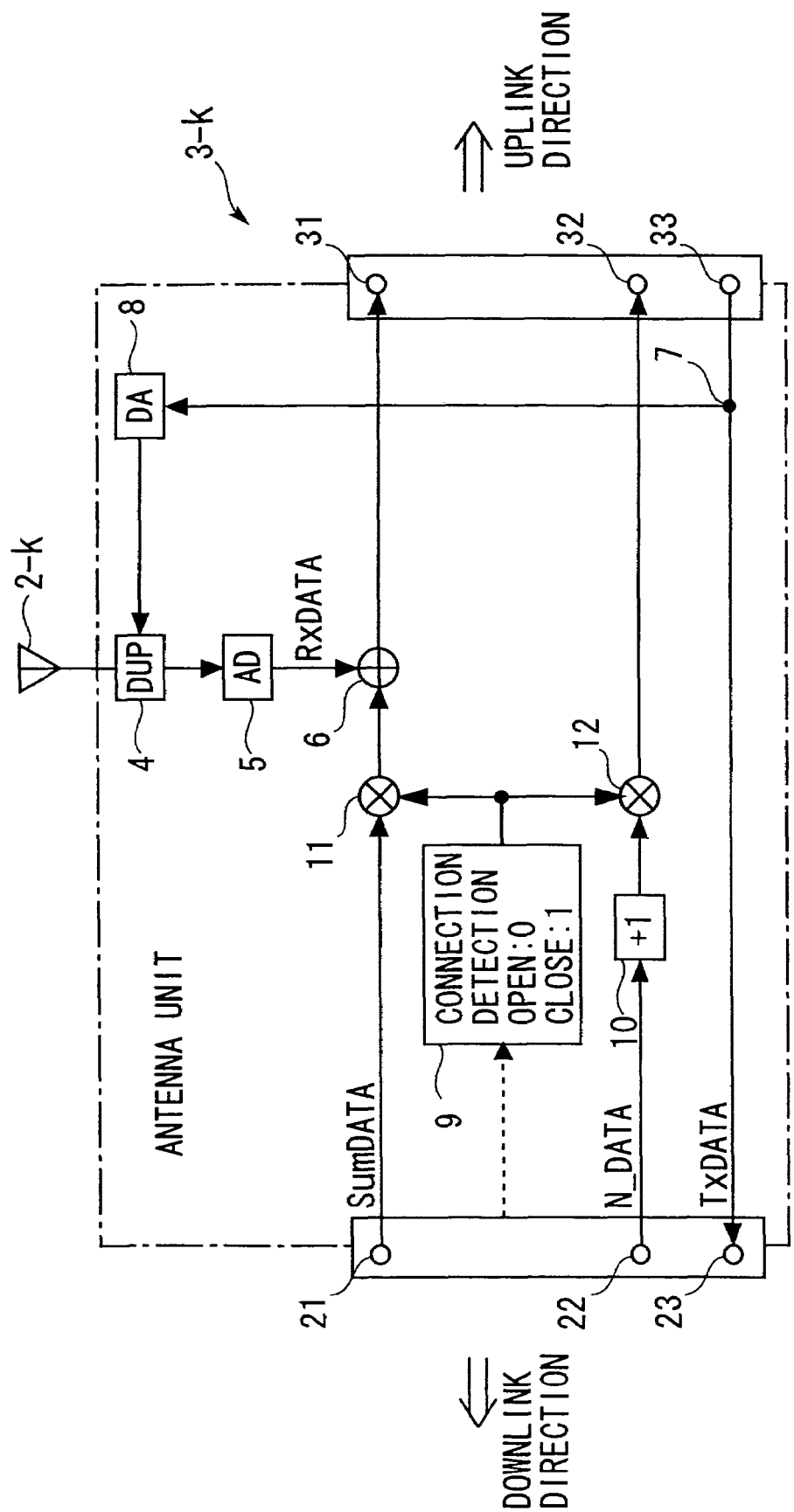
FIG. 3 shows a configuration of an antenna unit 3 according to the first embodiment.

FIG. 3 illustrates a configuration of an antenna unit 3 of this embodiment. The antenna unit 3-1 and the like are generically called the antenna unit 3. The antenna 2-1 and the like are generically called an antenna 2.

As shown in FIG. 3, the antenna unit (3-k, now) includes terminals 21, 22, and 23 for connection with the downlink side antenna unit 3-(k−1), and terminals 31, 32, and 33 for connection with the uplink side antenna unit 3-(k+1). The added digital data is input from the downlink side antenna unit 3-(k−1) to the terminal 21. The number of connected antennas is input from the downlink side antenna unit 3-(k−1) to the terminal 22. On the other hand, from the terminal 23, the transmission digital data (TxDATA) is output to the downlink side antenna unit 3-(k−1).

On the other hand, from the terminal 31, the added digital data (SumDATA) is output to the uplink side antenna unit 3-(k+1). From the terminal 32, the number of connected antennas (N_DATA) is output to the uplink side antenna unit 3-(k+1). On the other hand, the transmission digital data is input from the uplink side antenna unit 3-(k+1) to the terminal 33.

The antenna unit (3-k) includes a duplexer 4 connected to the antenna 2, an A/D converter 5 for subjecting an output of the duplexer 4 to A/D conversion, an adder 6 for adding AD-converted reception digital data (RxDATA) to the added digital data (SumDATA) input from the downlink side antenna unit 3-(k−1), a duplicating unit 7 for branching and duplicating the transmission digital data (TxDATA) input from the uplink side antenna unit, and a D/A converter 8 for subjecting the duplicated transmission digital data to D/A conversion.

Further, the antenna unit (3-k) includes an adder 10 for integrating the number of connected antennas (N_DATA) from the last antenna unit (3-1) of the downlink direction side to the current antenna unit (3-k), a connection detection unit 9 for detecting a connection with the downlink direction side antenna unit 3-(k−1), a multiplier 11 for clearing added digital data (SumDATA) input from the downlink side antenna unit 3-(k−1) and a multiplier 12 for clearing the number of connected antennas (N_DATA) input from the downlink side antenna unit 3-(k−1) when a result of the connection detection shows no connection with the downlink direction side antenna unit 3-(k−1).

The antenna 2 transmits a radio signal to a not-shown mobile station, and receives a radio signal from the mobile station. The duplexer 4 is used for sharing the antenna 2 for transmission and reception.

The A/D converter 5 receives a signal input from the duplexer 4, and converts the signal into a reception digital signal (RxDATA). On the other hand, the D/A converter 8 subjects transmission digital data branched by the duplicating unit 7 to D/A conversion, and supplies power to the antenna 2 via the duplexer 4.

The added digital data (SumDATA) is input from the input terminal 21, and multiplied with an output (0 or 1) of the connection detection unit 9 by the multiplier 11. Further, the reception digital data (RxDATA) is digitally added to the added digital data (SumDATA) by the adder 6. Accordingly, the reception digital data of the antenna unit 3-(k−1) or the like connected to the downlink direction side from the antenna unit 3-k is added to the added digital data (RxDATA). Then, the added digital data (SumDATA) is output from the output terminal 31 to the antenna unit 3-(k+1) of the uplink direction side.

Similarly, the number of connected antennas (N_DATA) is input from the input terminal 22, and 1 is added thereto by the adder 10. Further, the number of connected antennas (N_DATA) is multiplied with the output (0 or 1) of the connection detection unit 9 by the multiplier 12. Accordingly, for the number of connected antennas (N_DATA), the number of connected antenna units 3-(k−1) or the like connected from the antenna unit 3-k to the downlink direction side is counted. Then, the number of connected antennas (N_DATA) is output from the output terminal 32 to the antenna unit 3-(k+1) of the uplink direction side.

A connection with the antenna unit 3-(k−1) of the downlink direction side (e.g., digital value of 0 or 1) has been input to the connection detection unit 9, and 0 or 1 is input to the multiplier 11 or 12 according to the connection.

As described above, the added digital data (SumDATA) is input from the downlink direction side antenna unit 3-(k−1) to the input terminal 21, subjected to the arithmetic operations by the multiplier 11 and the adder 6, and then output from the output terminal 31 to the uplink direction side antenna unit 3-(k+1).

Further, the number of connected antennas (N_DATA) is input from the downlink direction side antenna unit 3-(k−1) to the input terminal 22, and output from the output terminal 32 to the uplink direction side antenna unit 3-(k+1) after the arithmetic operation by the multiplier 12.

On the other hand, transmission digital data (TxDATA) is input from the uplink direction side antenna unit 3-(k+1) to the input terminal 33, branched off a signal of the antenna 2 by a duplicating unit 7, and then output from the output terminal 23 to the downlink direction side antenna unit 3-(k−1).

<Configuration of Base Station Device 1>

Figure 4:
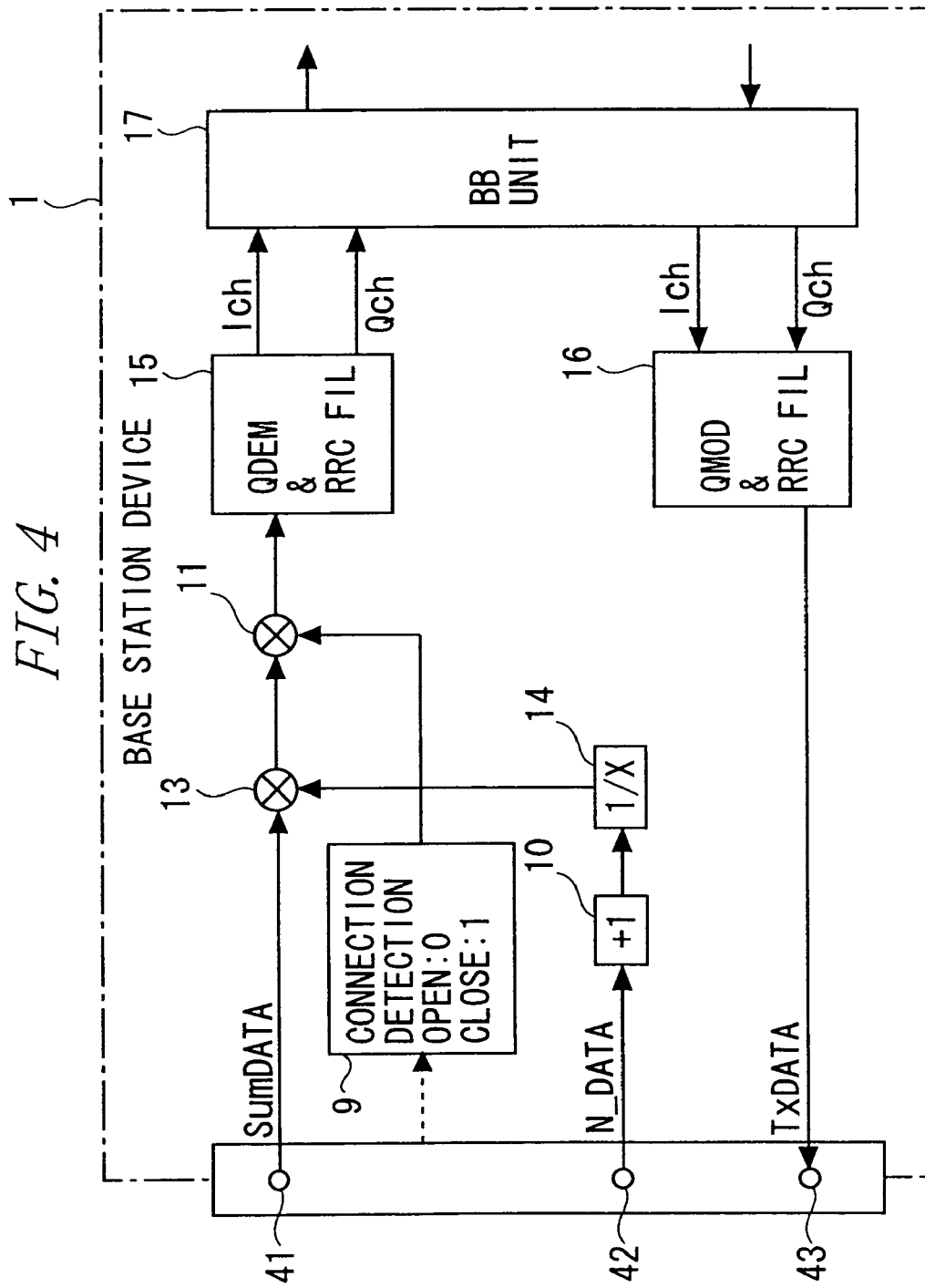
FIG. 4 is a diagram showing a base station device according to the first embodiment.

FIG. 4 is a diagram showing the base station device 1 of this embodiment. As shown in FIG. 4, the base station device 1 includes terminals 41, 42, and 43 for connection with the downlink side antenna unit 3-n. Added digital data (SumDATA) is input from an adjacent antenna unit 3-n to the terminal 41. The number of connected antennas (N_DATA) is input from the antenna unit (3-n) to the terminal 42. On the other hand, transmission digital data (TxDATA) is output from the terminal 43 to the adjacent antenna unit 3-n.

The base station device 1 includes a connection detection unit 9 for detecting a connection with the antenna unit 3-n, a multiplier 11 for clearing the added digital data (SumDATA) input from the antenna unit 3-n when a result of the connection detection shows no connection with the antenna unit 3-n, an adder 10 for adding 1 to the number of connected antennas (N_DATA), a computing unit 14 for calculating an inverse number of the added number of connected antennas (N_DATA), a multiplier 13 for obtaining an average of reception digital data from the added digital data (SumDATA) and the inverse number of the number of connected antennas (N_DATA), a digital quadrature demodulator (QDEM) for demodulating received data from the average of the reception digital data, a digital root raised cosine filter (RRC FIL) for limiting a band of the demodulated reception digital data, a base band unit 17 for executing base band processing for the reception digital data band-limited by the digital root raised cosine filter, a digital root raised cosine filter (RRC FIL) for limiting a band of transmission data generated by the base band unit 17, and a digital quadrature modulator QMOD for modulating the band-limited transmission digital data.

According to this embodiment, the digital quadrature demodulator (QDEM) and the digital root raised cosine filter (RRC FIL) are integrated in one functional block called a digital quadrature demodulation unit 15. The quadrature demodulation unit 15 separates averaged reception signal signals into I and Q channels, demodulates the signals, and passes the signals to the base band processing unit 17.

The digital quadrature modulator (QMOD) and the digital root raised cosine filter (RRC FIL) are integrated in one functional block called a digital quadrature modulation unit 16. The digital quadrature modulation unit 16 subjects the I and Q channel signals passed from the base band processing unit 17 to digital quadrature modulation, and passes the signals to the antenna units 3-1 to 3-n.

Transmission digital data TxDATA of a downlink direction output from the digital quadrature modulation unit 16 is transmitted from the output terminal 43 to the antenna units 3-1 to 3-n.

On the other hand, the reception digital signal input from the input terminal 41 is digitally divided by the number of connected antennas N_DATA(n) input from the input terminal 42.

Then, this division value is input as a calculated average value of digital values of radio signals received by all the antenna units 3-1 to 3-n to the quadrature demodulation unit 15.

The connection detection unit 9 outputs data of 1 or 0 according to a connection with the adjacent antenna unit 3-n. Then, if there is no connection with the antenna unit 3-n, N_DATA(n−1) is multiplied by 0 to clear the reception digital data (SumDATA).

The adder 10 adds 1 to the number of connected antennas (N_DATA) input to the input terminal 42. The reception digital data (SumDATA, digital added value) is divided by this number of connected antennas (N_DATA) to calculate an average of reception signals.

A reason for adding 1 to the number of connected antennas (N_DATA) in the base station device 1 is that the number of connected antennas is a value smaller by 1 than the real number of connected antennas. Thus, in each antenna unit 3-(k), by calculating a value (k−1) smaller by 1 than the real number of connected antennas, it is possible to reduce the bit number of a signal for transmitting the number of connected antennas.

With this configuration, even when the number of connected antenna units 3-1 to 3-n is changed, it is possible to calculate an average of the reception signals without changing setting of the base station device.

<Effects>

According to the base station system of this embodiment, the plurality of antenna units 3-1 to 3-n are linearly connected, and the D/A conversion of the transmission signal and the A/D conversion of the reception signal are executed in each antenna unit. Thus, power losses from the base station device 1 to the antenna units 3-1 to 3-n can be suppressed.

Moreover, the antenna units 3-1 to 3-n include the antennas 2-1 to 2-n. Accordingly, by installing the antenna units 3-1 to 3-n in desired positions, it is possible to reduce dead zones of mobile communication even in an area of an extremely short reaching distance of an electromagnetic wave.

For example, during transmission (downlink direction), transmission power can be supplied roughly uniformly to predetermined cells by the antennas 2-1 to 2-n.

Meanwhile, during reception, a reception signal can be received from the antenna 2-k closest to a mobile station. As a result of a difference in distance between the mobile station and the antennas 2-1 to 2-n, a phase difference is generated in the reception signals received by the antennas 2-1 to 2-n. Such reception signals having a phase difference between the antennas can be synthesized by RAKE synthesis. Thus, the mobile station only needs to be capable of communicating with one antenna 2-k.

With this configuration, in both cases of transmission from the base station to the mobile station and reception from the mobile station, it is possible to reduce dead zones of mobile communication.

Furthermore, according to the base station system, each antenna unit divides the digital added value (SumDATA) of the reception digital data by the number of connected antennas (N_DATA) to calculate an average value. By this average calculation, a range of digital added values (SumDATA) of the reception digital data, i.e., a bit number necessary for information transmission, can be reduced.

Second Embodiment

Hereinafter, a second embodiment of the present invention will be described with reference to FIGS. 5 to 8. The first embodiment has shown the configuration of the base station system where the plurality of antenna units 3-1 to 3-n are linearly connected. This embodiment will be described by way of a base station system where a plurality of antenna units are connected by being branched in a tree form. Other components and operations are similar to those of the base station system of the first embodiment. Thus, components similar to those of the first embodiment are denoted by similar reference symbols, and description thereof will be omitted. When necessary, reference will be made to FIGS. 2 to 4.

Figure 5:
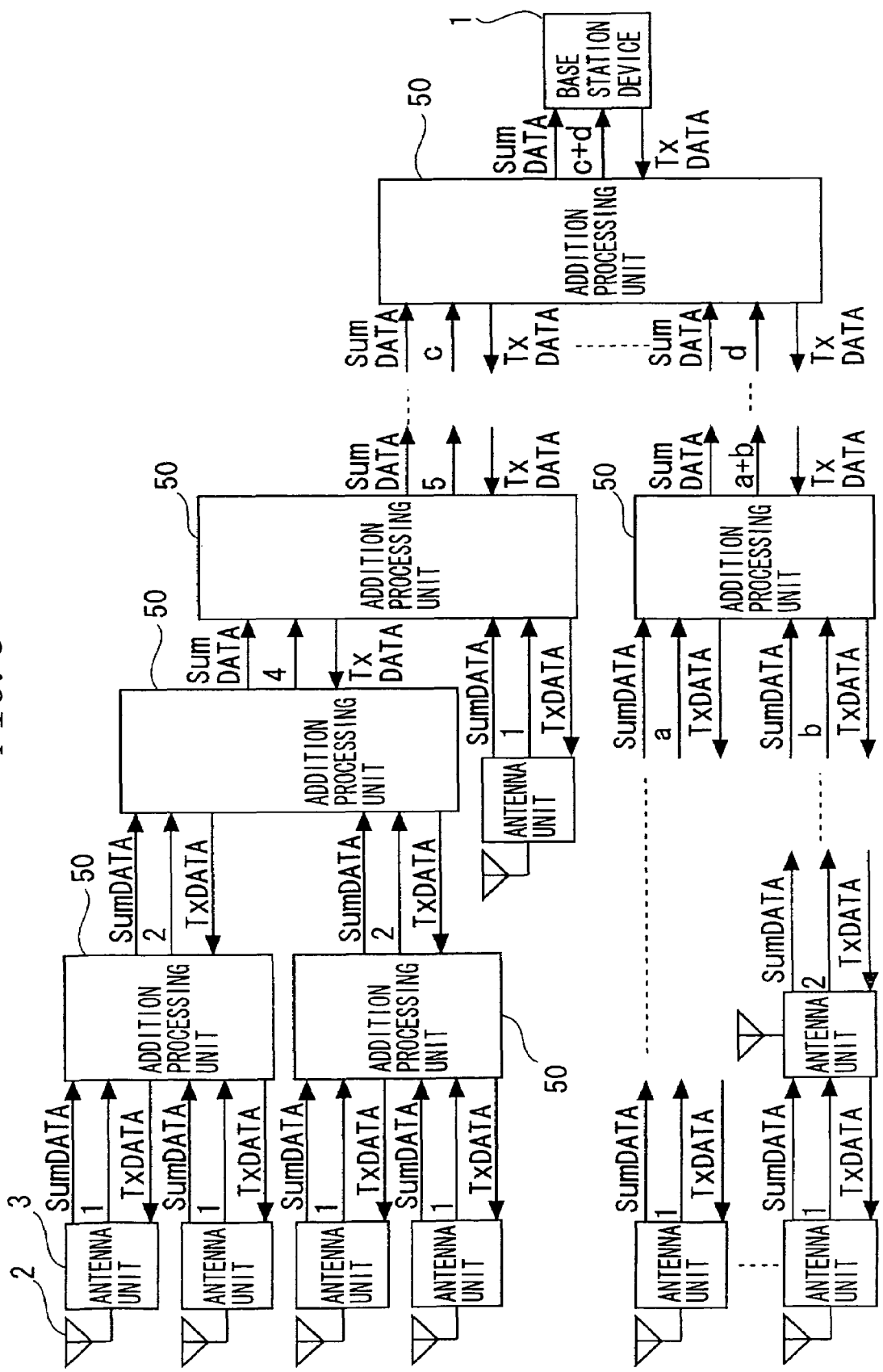
FIG. 5 shows a connection example of antenna units in a base station system according to a second embodiment.

FIG. 5 shows a connection example of antenna units in the base station system. As shown in FIG. 5, according to this embodiment, the base station system includes a base station device 1, addition processing units 50 branched in a tree form from the base station device 1, and antenna units 3 connected in parallel to the addition processing units 50.

According to this embodiment, a plurality of antenna units 3 may be linearly connected. In this embodiment, in the case of identifying the linearly connected antenna units 3, they are called antenna units 3-k. When it is not necessary to identity an adjacent antenna unit, it is simply called an antenna unit 3.

Figure 6:
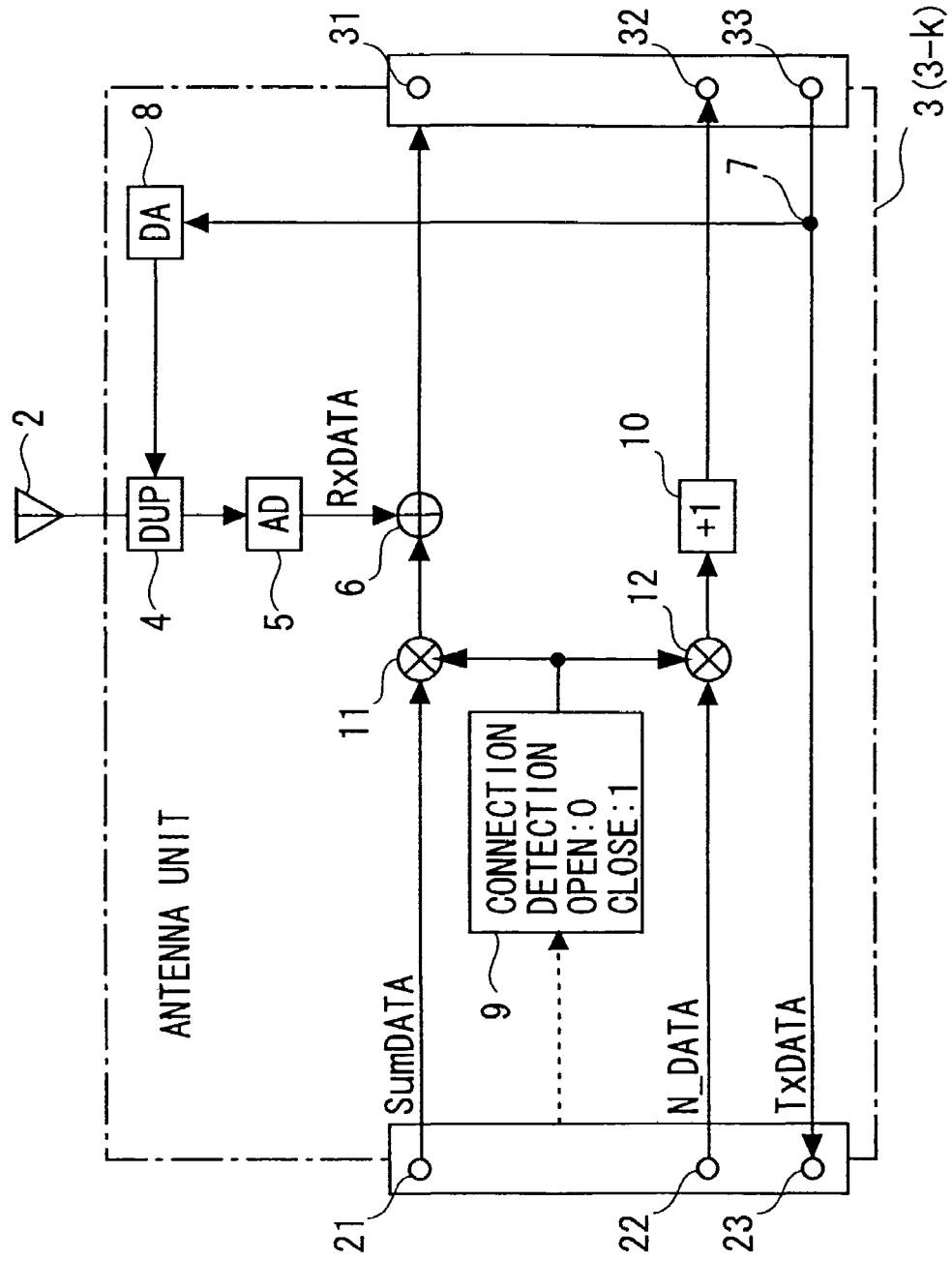
FIG. 6 shows a configuration of the antenna unit according to the second embodiment.

FIG. 6 shows a configuration of the antenna unit 3 (3-k). As shown in FIG. 6, this antenna unit 3 has a configuration substantially similar to that of the antenna unit of the first embodiment. However, this embodiment is different from the first embodiment in that the real number k of connected antennas is calculated as the number of k-th connected antennas (N_DATA) when k pieces of antenna units 3 are linearly connected. This is for the purpose of simplifying an arithmetic operation of the addition processing unit 50 shown in FIG. 5.

That is, in the antenna unit 3 of this embodiment, the number of connected antennas (N_DATA) is multiplied with a detection result of the connection detection unit 9 by the multiplier 12, and then 1 is added thereto by the adder 10. With this configuration, when k pieces of antenna units 3 are linearly connected, k is calculated as the number of k-th connected antenna units 3-k (N_DATA).

Figure 7:
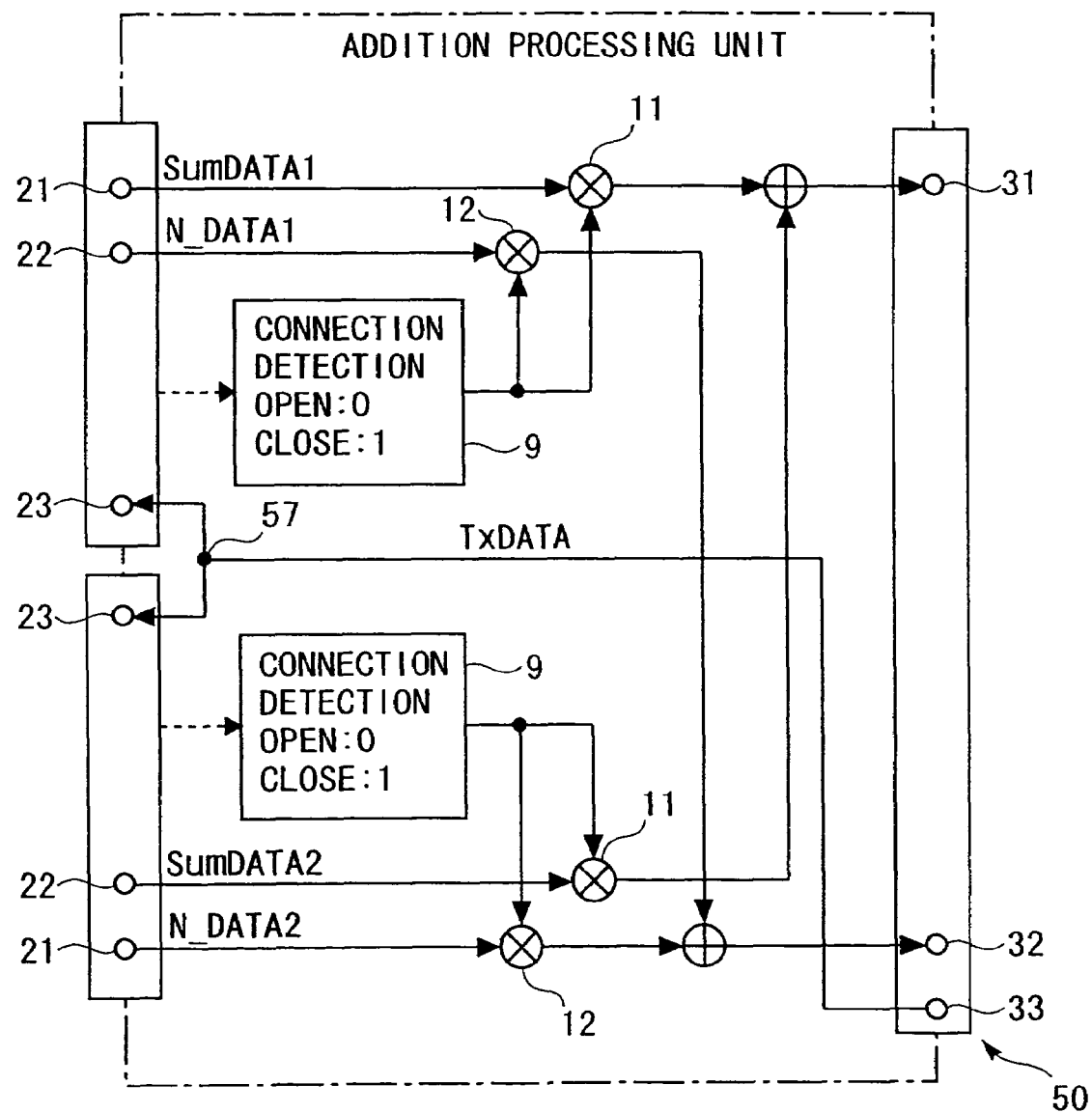
FIG. 7 shows a configuration of an addition processing unit according to the second embodiment.

FIG. 7 shows a configuration of the addition processing unit 50 of this embodiment. The addition processing unit 50 includes downlink direction interfaces which are a combination of two interface configurations similar to that of the antenna unit 3, i.e., downlink direction interface (terminals 21, 22, and 23), and an uplink direction interface (terminals 31, 32, and 33) similar to that of the antenna unit 3.

Referring to FIG. 7, in each addition processing unit 50, two pieces of added digital data input from a front stage (downlink direction side) are set as SumDATA1 and SumDATA2. The addition processing unit 50 adds together the two pieces of added digital data SumDATA1 and SumDATA2, and then transmits an added value to a rear stage (uplink direction addition processing unit 50). Additionally, the addition processing unit 50 transmits an added value of two numbers of connected antennas N_DATA1 and N_DATA2 input from the front stage to the rear stage.

The addition processing unit 50 includes a duplicating unit 57 which branches transmission digital data (TxDATA) input from the uplink direction side (addition processing unit 50 or base station device 1 of the uplink direction side). Then, the addition processing unit 50 transmits the branched transmission digital data (TxDATA) through the output terminals 23 and 23 to the addition processing unit 50 or the antenna unit 3 of the downlink direction side.

Furthermore, the addition processing unit 50 includes connection detection units 9 and 9 for detecting downlink direction connections for the two downlink direction interfaces. Each of the connection detection units 9 and 9 detects a connection of each downlink direction element (antenna unit 3 or addition processing unit 50 of downlink direction). If there is no connection for any of the downlink direction elements, a signal from the downlink direction is multiplied with 0 by the multipliers 11, 11, 12, and 12. This processing of each of the connection detection units 9 and 9 is similar to that of each of the antenna units 3-1 to 3-n of the first embodiment.

Figure 8:
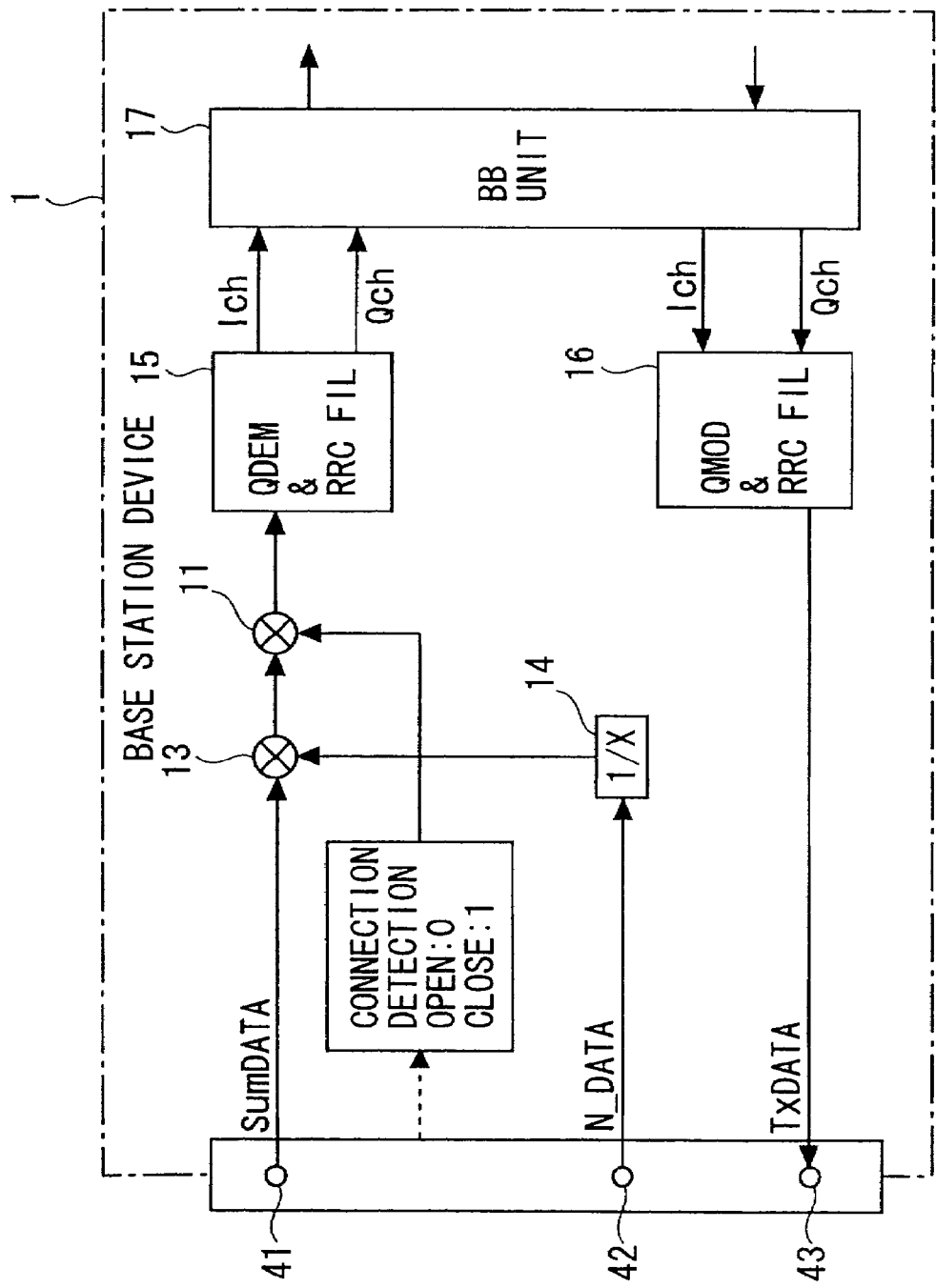
FIG. 8 shows a configuration of a base station device according to the second embodiment.

FIG. 8 shows a configuration of the base station device 1 of this embodiment. As shown in FIG. 8, this base station device 1 has a configuration substantially similar to that of the base station device 1 of the first embodiment except for the feature that an adder 10 for adding the number of connected antennas (N_DATA) is not provided. This is because, according to this embodiment, the real number k of connected antennas is calculated as the number of k-th connected antennas (N_DATA) when k antenna units 3 are linearly connected. Thus, in the base station device 1, it is not necessary to add 1 to the number of connected antennas (N_DATA).

<Effects>

With this configuration, according to the base station system of this embodiment, as in the case of the foregoing first embodiment, it is possible to suppress power losses from the base station device 1 to the antenna units 3-1 to 3-n. According to the base station system of this embodiment, by installing the antenna units 3-1 to 3-n in desired positions, it is possible to reduce dead zones of mobile communication even in an area of an extremely short reaching distance of an electromagnetic wave.

Further, according to the base station system of this embodiment, a path for connecting the base station device 1 to the antenna unit 3 can be branched by the addition processing units 50. Thus, the antenna 2 can be arranged more flexibly as compared with the case of the first embodiment. By branching the path, a length of the path from the base station device 1 to each antenna unit 3 can be shortened. As a result, an absolute delay difference between the antennas can be adjusted. For example, to set absolute delays of all the antenna units equal to one another, the addition processing units 50 only need to be combined by topology of a tournament system. Moreover, by employing the configuration, it is possible to simplify the work of arranging the antenna unit 3.

Third Embodiment

Hereinafter, a third embodiment of the present invention will be described with reference to FIGS. 9 and 10. The first embodiment has shown the configuration of the base station system where the plurality of antenna units 3-1 to 3-n are linearly connected. The digital added value (added digital data SumDATA) of the reception signals from the antenna units 3-1 to 3-n and the total number of connected antennas (number of connected antennas N_DATA) are transmitted to the base station device 1. Further, the base station device 1 calculates the average of the reception digital data based on the added digital data SumDATA and the number of connected antennas N_DATA, and performs digital quadrature demodulation.

This embodiment will be described by way of example of implementing average calculation of reception digital data in each antenna unit. Other components and operations are similar to those of the first embodiment. Thus, components similar to those of the first embodiment are denoted by similar reference symbols, and description thereof will be omitted. When necessary, reference will be made to FIGS. 2 to 4.

To begin with, according to this embodiment, topology of connecting the antenna units 3-1 to 3-n to the base station device 1 is similar to that of the first embodiment shown in FIG. 2, and thus description thereof will be omitted.

Figure 9:
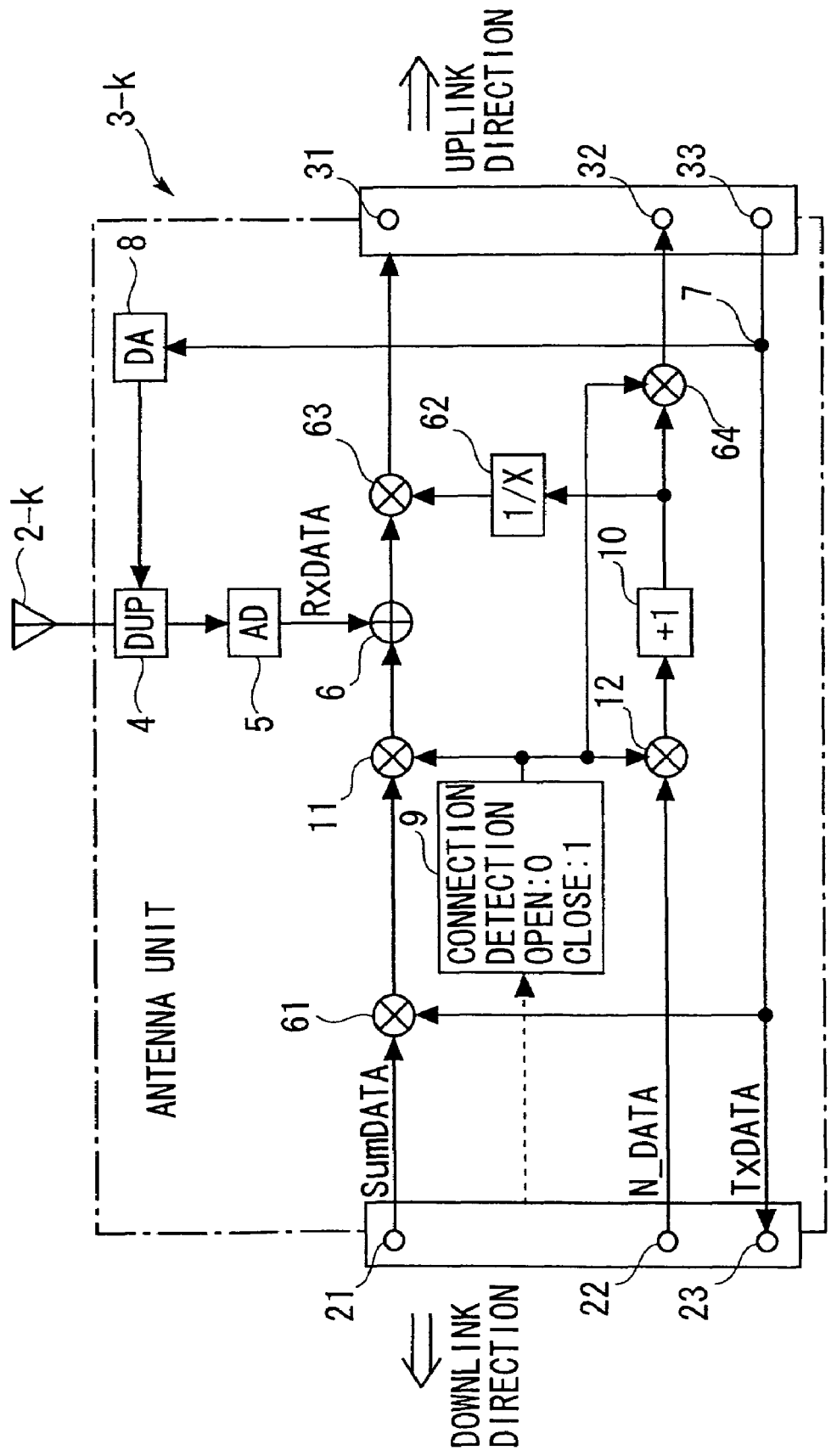
FIG. 9 shows a configuration of an antenna unit according to a third embodiment.

FIG. 9 shows a configuration of an antenna unit 3-k. According to this embodiment, an average of reception digital data (SumDATA) of a downlink direction is calculated and input to each antenna unit 3-k via an input terminal 21. Thus, according to this embodiment, the reception digital data will be called average reception digital data (SumDATA).

As shown in FIG. 9, as compared with the antenna unit of the first embodiment, the antenna unit 3-k additionally includes a multiplier 61 for multiplying the average reception digital data (SumDATA) by the number of connected antennas (N_DATA) to calculate added digital data, a computing unit 62 for adding 1 to the number of connected antennas and then calculating its inverse number, a multiplier 63 for calculating an average again after the added digital data and reception digital data (RxDATA) received by an antenna unit 2-k are added together, and a multiplier 64 for clearing the number of connected antennas (N_DATA) to be passed in an uplink direction according to a detection result of a connection detection unit 9.

As described above, the average reception digital data (SumDATA) input from an antenna unit 3-(k−1) adjacent to the downlink direction side to the input terminal 21 is an average of reception digital data from the last antenna unit 3-1 to the adjacent antenna unit 3-(k−1).

The number of connected antennas (N_DATA) is the number of connected antennas from the last antenna unit 3-1 to the adjacent antenna unit 3-(k−1).

According to this embodiment, the antenna unit 3-k multiplies the average reception digital data (SumDATA) with the number of connected antennas (N_DATA) by the multiplier 61. As a result, added digital data (added value of reception digital data) up to the adjacent antenna unit 3-(k−1) is calculated. This added digital data and the reception digital data (RxDATA) from the antenna unit 2-k are added together by the adder 6.

Further, the number of connected antennas (N_DATA) is multiplied with 1 or 0 by the multiplier 12 according to the connection detection result of the connection detection unit 9 (connection with downlink direction antenna unit 3-(k−1)). This is similar to the case of the first embodiment. Then, 1 is added to the number of connected antennas (N_DATA) by the adder 10. This is for addition of the number of connected antennas in the antenna unit 3-k.

Then, the number of connected antennas (N_DATA) is converted into an inverse number by the computing unit 62. The multiplier 63 calculates an average based on the added digital data to which the reception digital data (RxDATA) has been added and the inverse number of the number of connected antennas (N_DATA). This calculated average becomes average reception digital data after addition of the reception digital data (RxDATA) in the antenna unit 3-k.

The average reception digital data is transmitted from an output terminal 31 to an antenna unit 3-(k+1) of an uplink direction side or the base station device 1. The number of connected antennas N_DATA is transmitted from an output terminal 32 to the antenna unit 3-(k+1) of the uplink direction side or the base station device 1.

On the other hand, transmission digital data (TxDATA) is input from the antenna unit 3-(k+1) of the uplink direction side or the base station side 1 to an input terminal 33, branched by a duplicating unit 7, and then transmitted from the output terminal 23 to the antenna unit 3-(k−1) of the downlink direction. These components and operations are similar to those of the first embodiment.

Figure 10:
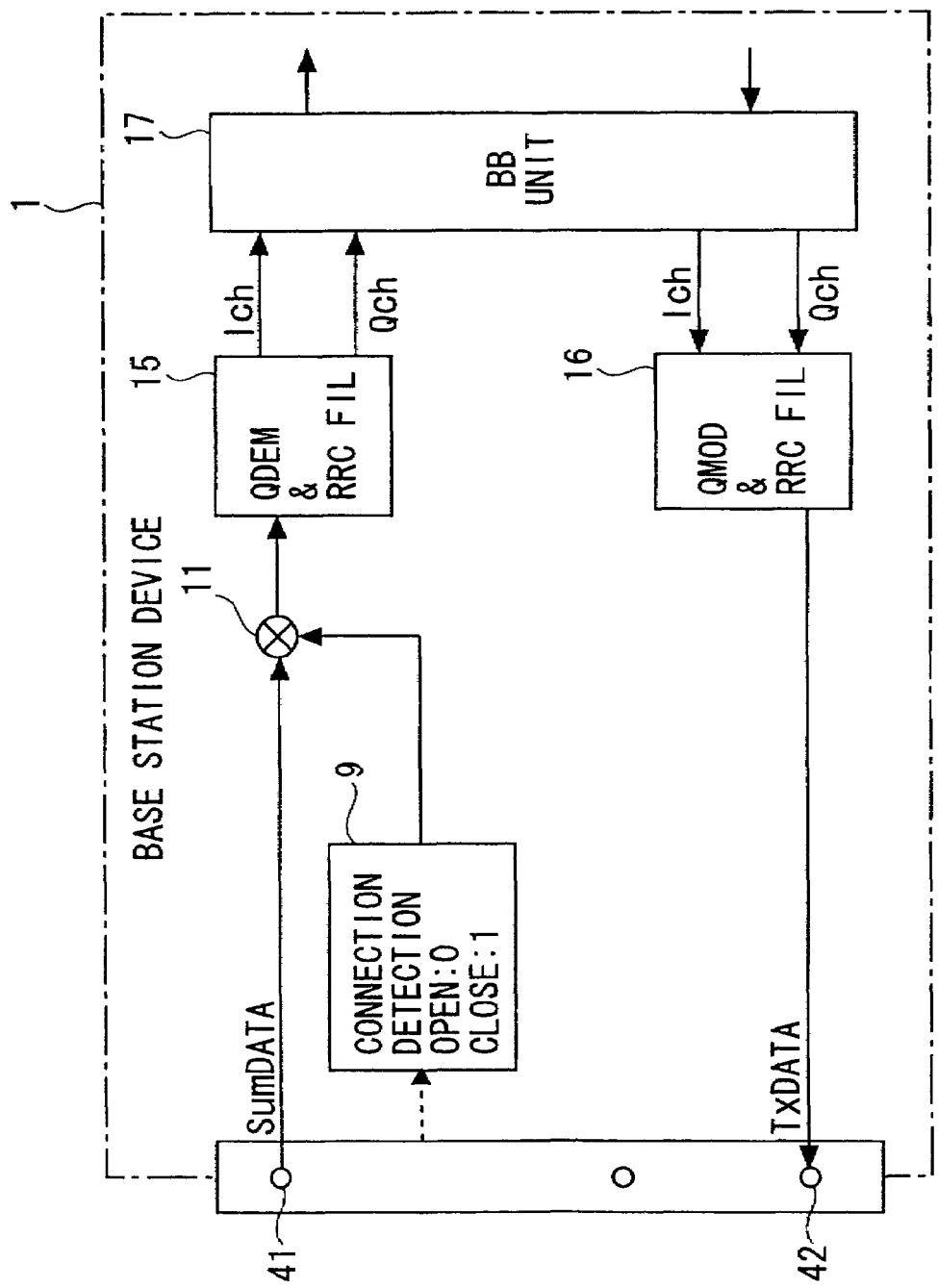
FIG. 10 shows a configuration of a base station device according to the third embodiment.

FIG. 10 shows a configuration of the base station device 1 of this embodiment. As shown in FIG. 10, as compared with the first embodiment, the base station device 1 does not include an adder 10 for adding the number of connected antennas (N_DATA), a computing unit 14 for calculating an inverse number of the number of connected antennas (N_DATA), and a multiplier 13 for calculating an average of reception digital data from the added digital data (SumDATA) and the inverse number of the number of connected antennas (N_DATA).

According to this embodiment, each antenna unit 3-k calculates an average of reception digital data from the last antenna unit 3-1 to the antenna unit 3-k, and base station device 1 does not need to calculate an average.

<Effects>

With this configuration, according to the base station system of this embodiment, as in the case of the foregoing first embodiment, it is possible to suppress power losses from the base station device 1 to the antenna units 3-1, . . . , 3-n. According to the base station system of this embodiment, by installing the antenna units 3-1 to 3-n in desired positions, it is possible to reduce dead zones of mobile communication even in an area of an extremely short reaching distance of an electromagnetic wave.

Further, according to the base station system of this embodiment, the average of the reception digital data is calculated in each antenna unit 3-k. Thus, according to the base station system, it is possible to prevent an increase in bit number as the result of adding a value of the reception digital value.

That is, according to the base station system of this embodiment, the number of antenna units is automatically detected. Then, based on the detected value, an average of reception digital signals is calculated by the following recurrence equation.

$$S_n = (1/n)\{(n-1)S_{n-1} + a_n\} \quad \text{(Equation 1)}$$

Here, $a_n$ is a signal received by each antenna, and Sn is a reception signal synthesized value up to an n-th stage. By executing processing of the recurrence equation in each antenna unit, data bit numbers between the antenna units and of the base station device can be suppressed to amounts equal to one antenna unit. In other words, it is possible to reduce a range of data transferred between the antenna units.

As compared with the first embodiment, it is not necessary to transfer data corresponding to the number of connected antennas (N_DATA) between the antenna units. Thus, at least a bit number corresponding to the number of connected antennas (N_DATA), i.e., $\log_2 n$ (bit), can be reduced.

Furthermore, without changing setting of the base station device even when the number of connected antenna units is changed, an average of the reception digital data is calculated according to the recurrence equation.

Fourth Embodiment

Hereinafter, a fourth embodiment of the present invention will be described with reference to FIGS. 11 to 13. Each of the first to third embodiments has shown the example of configuring the base station system by connecting the plurality of antenna units 3-1 to 3-n. According to this embodiment, a base station device 1 is connected in parallel to antenna units 3-1 to 3-n. Further, in this embodiment an example of adjusting a gain of an amplifier for amplifying a reception signal of the antenna units 3-1 to 3-n based on reception digital data (SumDATA) transmitted to the base station device 1 is described. Other components and operations of this embodiment are similar to those of the first to third embodiments. Thus, components similar to those of the foregoing embodiments are denoted by similar reference symbols, and description thereof will be omitted. When necessary, reference will be made to FIGS. 2 to 10.

Figure 11:
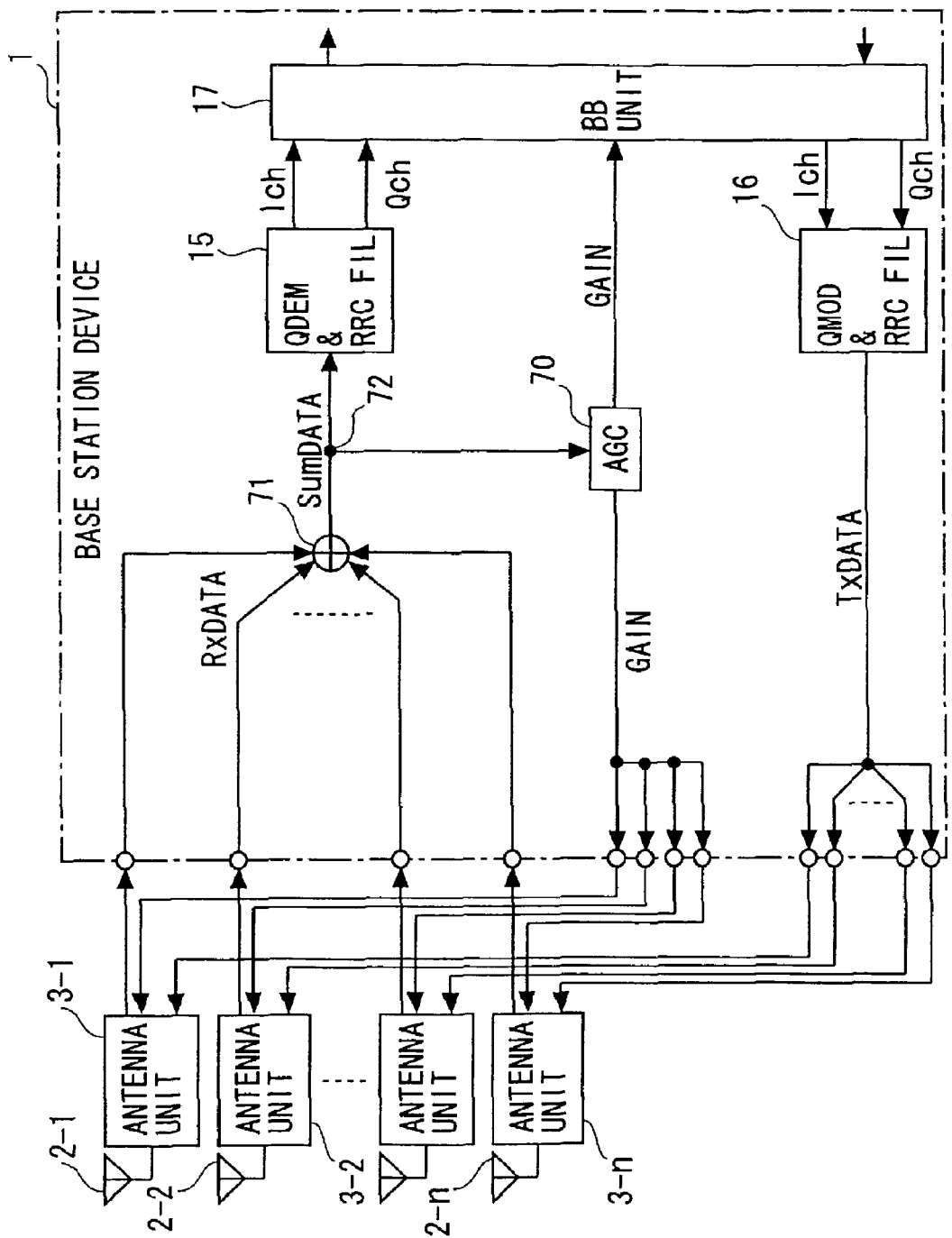
FIG. 11 shows a configuration of a base station system according to a fourth embodiment.

FIG. 11 shows a configuration of the base station 1 of this embodiment. As shown in FIG. 11, according to this embodiment, this base station 1 is connected to the antenna units 3-1 to 3-n in parallel.

Reception digital data (RxDATA) received by the antenna units 3-1 to 3-n are individually input to an adder 71. The adder 71 adds together the input reception digital data (RxDATA), and then inputs the added data to a quadrature demodulation unit 15 and a gain control unit 70 via a duplicating unit 72.

The quadrature demodulation unit 15 subjects the added reception digital data to digital quadrature demodulation. The quadrature demodulation unit 15 passes I and Q channel signals obtained by the digital quadrature demodulation to a base band processing unit 17.

Meanwhile, the gain control unit 70 calculates a gain to be set in each of the antenna units 3-1 to 3-n. Then, the gain control unit 70 instructs the calculated gain to each of the antenna units 3-1 to 3-n, and reports the gain to the base band processing unit 17.

Each of the antenna units 3-1 to 3-n amplifies the reception signal by the gain instructed from the gain control unit 70, converts the signal into digital data, and passes the digital data to the base station device 1. Accordingly, the base band processing unit 17 can recognize reception power actually received by the antennas 2-1 to 2-n.

As a result, the base band processing unit 17 recognizes a ratio of a gain of an antenna other than the antennas 2-1 to 2-n based on the reported gain. Such a gain of the amplifier at each of the antenna units 3-1 to 3-n is used, for example, when diversity with the antennas other than the antennas 2-1 to 2-n is executed (details on diversity are omitted in this embodiment).

In FIG. 11, processing of a quadrature modulation unit 16 is similar to that of the first embodiment, and thus description thereof will be omitted.

Figure 12:
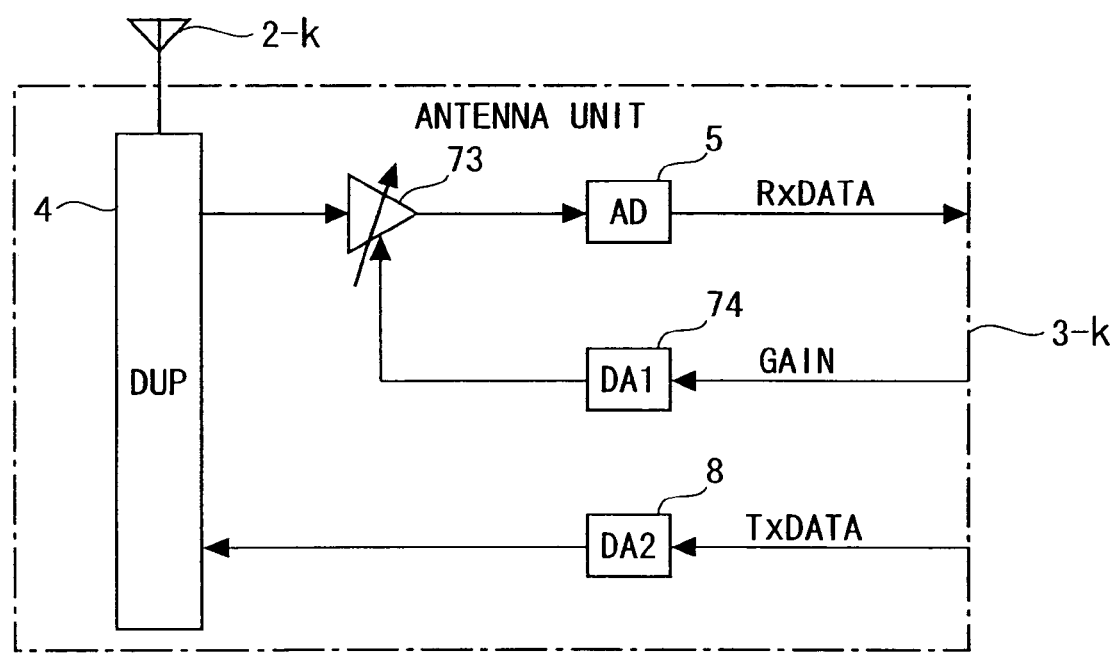
FIG. 12 shows a configuration of an antenna unit according to the fourth embodiment.

FIG. 12 shows a configuration of the antenna unit 3-k of this embodiment. The antenna unit 3-k of this embodiment includes the duplexer 4 connected to the antenna 2-k, an amplifier 73 for amplifying a reception signal from the duplexer 4, the A/D converter 5 for subjecting the signal amplified by the amplifier 73 to A/D conversion, a D/A converter 74 for subjecting a gain instruction value from the gain control unit 70 (refer to FIG. 11) to D/A conversion, and the D/A converter 8 for subjecting transmission digital data from the base station device 1 to D/A conversion and passing the signal to a duplexer 7.

Among the components, operations of the duplexer 4, the A/D converter 5, and the D/A converter 8 are similar to those of the first embodiment. According to this embodiment, however, an output of the A/D converter 5 is transmitted as reception digital data (RxDATA) to the base station device 1. The transmission digital data from the base station device 1 is transmitted to the D/A converter 8.

On the other hand, the gain instruction value from the gain control unit 70 is input to the D/A converter 74. The D/A converter 74 subjects the input instruction value to D/A conversion, and controls the gain of the amplifier 73. With this configuration, each antenna unit 3-k amplifies the reception signal according to the gain instruction value from the gain control unit 70.

Figure 13:
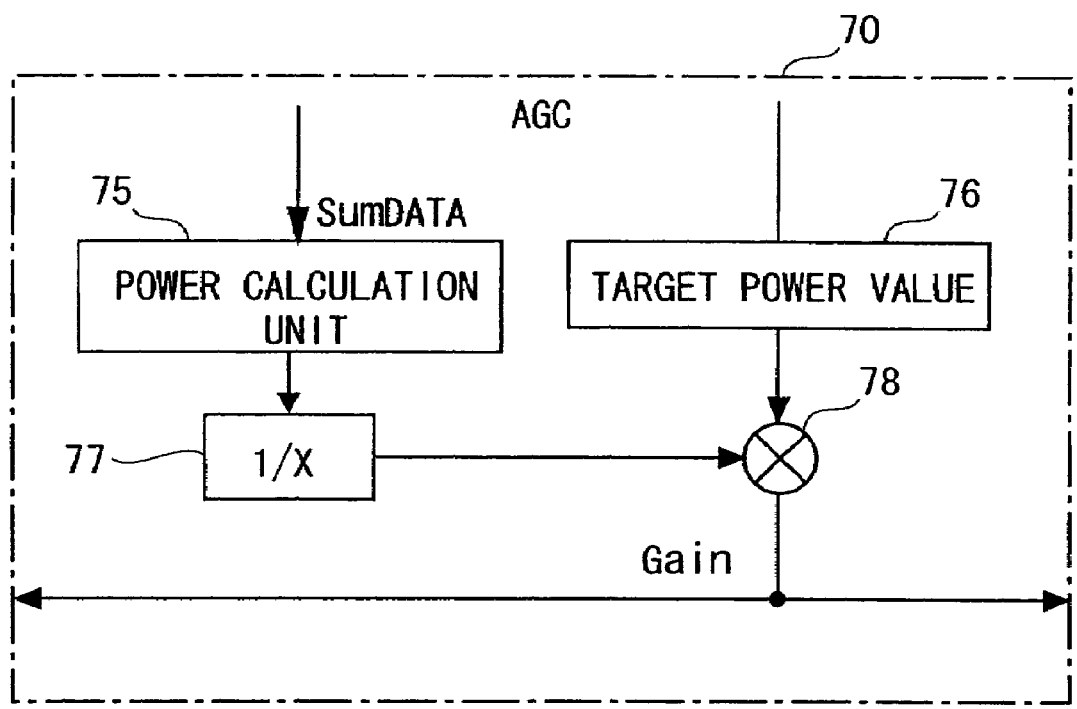
FIG. 13 shows a configuration of a gain control unit according to the fourth embodiment.

FIG. 13 shows a configuration of the gain control unit 70. The gain control unit 70 includes a power calculation unit 75 for calculating power of the added reception digital data (SumDATA), a register 76 for holding a target power value, a computing unit 77 for calculating an inverse number of the power value calculated by the power calculation unit 75, and a multiplier 78 for calculating a ratio of the target power value held in the register 76 with the power value calculated by the power calculation unit 75.

The target power value only needs to be set beforehand in the register 76. This target power value corresponds to an added value of reception power of the antenna units 3-1 to 3-n.

The power calculation unit 75 calculates reception power based on the added reception digital data (SumDATA). The multiplier 78 calculates a ratio of the target power value with the calculated reception power. This ratio is transmitted as a power instruction value to the antenna units 3-1 to 3-n.

<Effects>

With this configuration, to bring output power of the adder 71 shown in FIG. 11 closer to the target power value, in each of the antenna units 3-1 to 3-n, the gain of the amplifier 73 is set. As a result, according to the base station system, it is possible to control an input level of the input signal of the quadrature demodulator 15 shown in FIG. 11 in the vicinity of the target power.

In other words, since the input level of the receiver can be controlled within a predetermined range, it is possible to effectively use bit accuracy in digital arithmetic processing. Moreover, this control is executed before the A/D conversion. Thus, it is possible to expand an input dynamic range of the A/D converter 5 in proportion to a gain control range of the gain control amplifier 73.

Fifth Embodiment

Hereinafter, a fifth embodiment of the present invention will be described with reference to FIGS. 14 to 16. The fourth embodiment has been described by way of example of controlling the gain of the amplifier 73 in each of the antenna units 3-1 to 3-n by the gain control unit 70 installed in the base station device 1. This embodiment will be described by way of example of a base station system where this gain control unit 70 is installed in each of antenna units 3-1 to 3-n. Other components and operations are similar to those of the base station system of the fourth embodiment. Thus, components similar to those of the fourth embodiment are denoted by similar reference symbols, and description thereof will be omitted. When necessary, reference will be made to FIGS. 2 to 4 and FIGS. 11 to 13.

Figure 14:
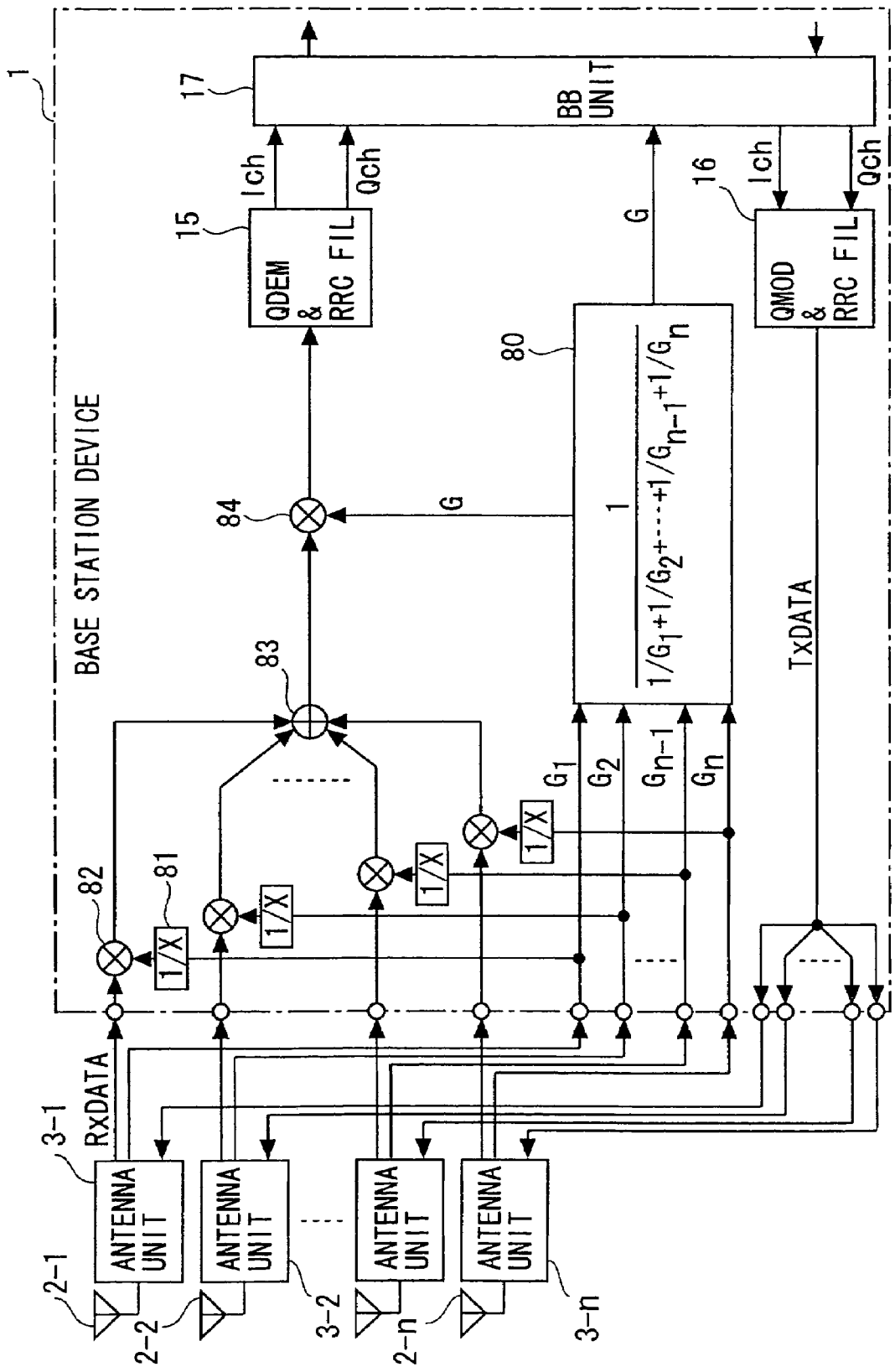
FIG. 14 shows a connection example of a base station device according to a fifth embodiment.

FIG. 14 shows a connection example of the base station device 1 of this embodiment. The base station device 1 of this embodiment receives reception digital data (RxDATA) input from the antenna units 3-1 to 3-n, and gains ($G_1$ to $G_n$) of amplifiers input from the antenna units 3-1 to 3-n.

The base station device 1 includes a computing unit 81 for calculating an inverse number, and a multiplier 82 for multiplying the reception digital data (RxDATA) by the inverse number. The computing unit 81 calculates an inverse number of the gain of the amplifier in each of the antenna units 3-1 to 3-n. The multiplier 82 divides amplified reception digital data in each of the antennas 3-1 to 3-n by the gain of each amplifier (multiplies by inverse numbers of gains $G_1$ to $G_n$).

Thus, digital data (referred to as reception digital data before amplification, hereinafter) corresponding to a reception signal received in the reception digital data (antennas 2-1 to 2-n) before amplification in each of the antenna units 3-1 and 3-n is calculated.

The base station device 1 adds the reception digital data before amplification by an adder 83. Additionally, the base station device 1 includes a computing unit 80 for calculating a synthesized gain G obtained by synthesizing the gains ($G_1$ to $G_n$) of the amplifiers in the antenna units 3-1 to 3-n. As shown in FIG. 14, the synthesized gain G is calculated by the following equation 2.

$$G = 1/(1/G_1 + 1/G_2 + \ldots + 1/G_n) \qquad \text{(Equation 2)}$$

Then, the base station device 1 multiplies the reception digital data before amplification which has been added by the adder 83 with the synthesized gain G by the multiplier 84. As a result, added data of reception digital signals after amplification in the antenna units 3-1 to 3-n is obtained. This added data is input to a quadrature demodulation unit 15, and divided into quadrature components to be demodulated as in the case of the first embodiment or the like.

The synthesized gain G calculated by the computing unit 80 is input to a base band processing unit 17. The base band processing unit 17 uses the synthesized gain for predetermined processing, e.g., diversity or the like.

Figure 15:
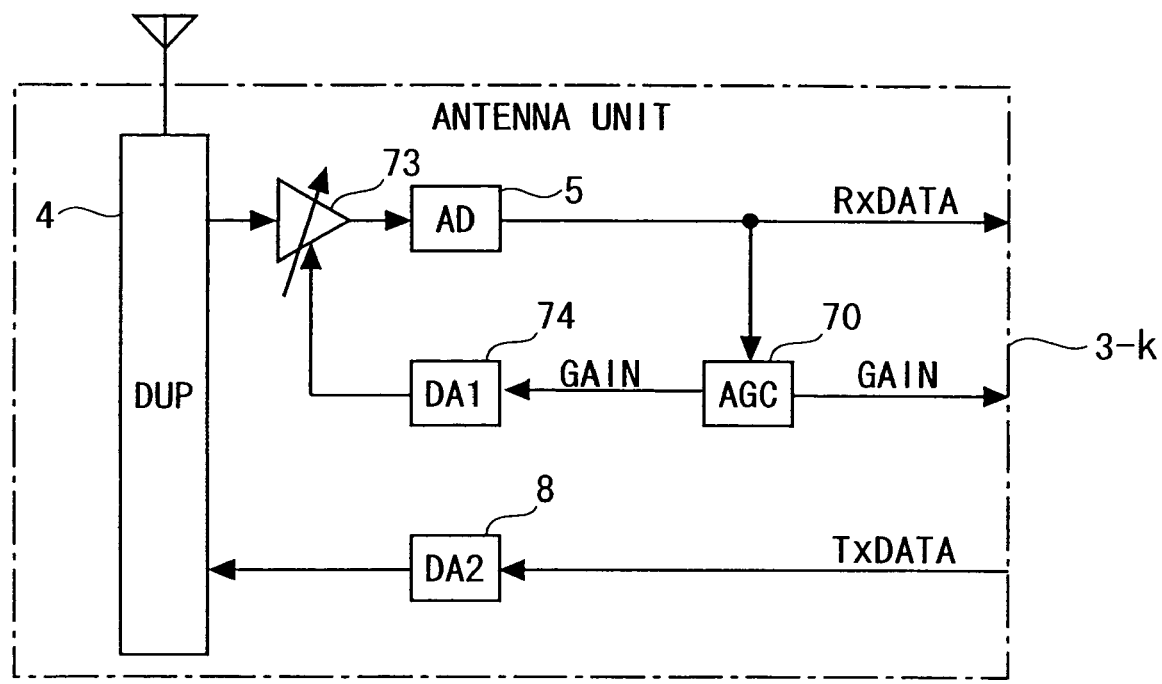
FIG. 15 shows a configuration of an antenna unit according to the fifth embodiment.

FIG. 15 shows a configuration of an antenna unit 3-k of this embodiment. This antenna unit 3-k is different from the case of the fourth embodiment (FIG. 12) in that a gain control unit 70 is provided.

Figure 16:
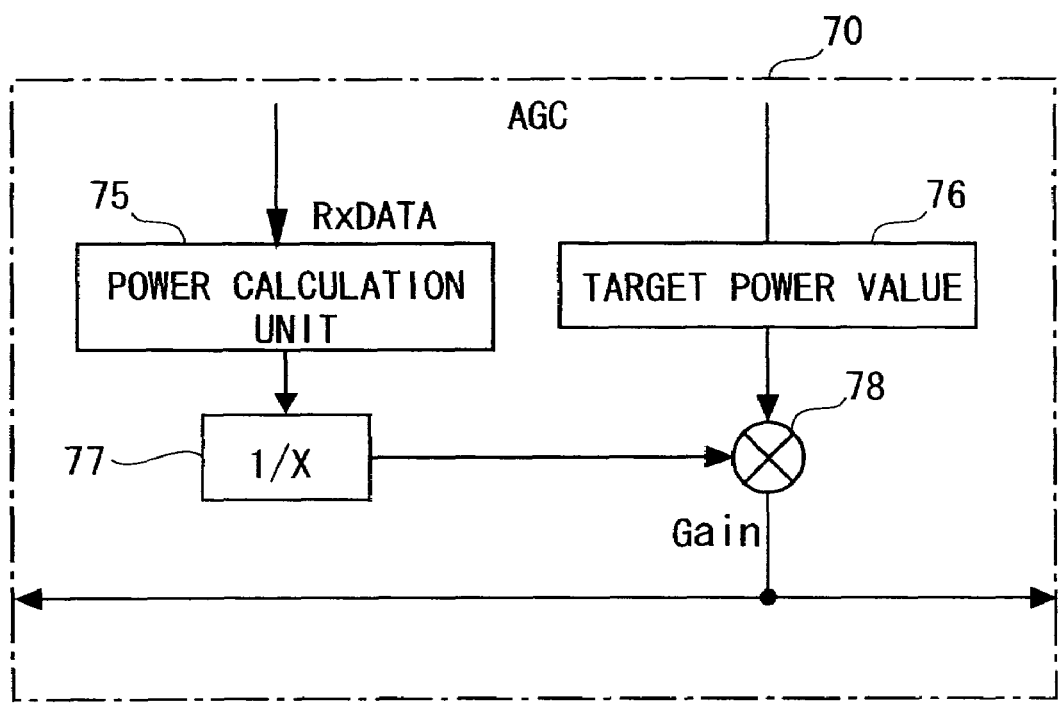
FIG. 16 shows a configuration of a gain control unit according to the fifth embodiment.

FIG. 16 shows a configuration of the gain control unit 70 of this embodiment. As shown in FIG. 16, the gain control unit 70 of this embodiment is similar in configuration to that of the fourth embodiment (FIG. 13). According to this embodiment, however, reception digital data (RxDATA) of the individual antenna units 3-k are input to a power calculation unit 75, and compared with a target power value. As a result of the comparison, an instruction value (Gain) for controlling a gain of an amplifier 73 is calculated. As shown in FIG. 15, the instruction value of the gain calculated by the gain control unit 70 is set in the amplifier 73 via a D/A converter 74. Instruction values of gains calculated by the gain control units 70 of the antenna units 3-1 to 3-n are reported as gains $G_1$ to $G_n$ to the base station device 1.

<Effects>

As described above, according to the base station system of this embodiment, the amplifiers 73 are controlled to match outputs of the amplifiers 73 of the antenna units 3-1 to 3-n with a target power value.

Then, in the base station device 1, the reception digital data are divided by the gains of the amplifiers 73, and then added digital data is calculated. Further, a synthesized gain G of the gains ($G_1$ to $G_n$) of the amplifiers 73 is calculated, and each added digital data is multiplied by this synthesized gain G.

The gain is controlled to the target power value in each of the antenna units 3-1 to 3-n. Thus, with the configuration of this embodiment, input power of the quadrature demodulation unit 15 can be controlled to a target power value (e.g., n multiple of a target power value of each of the antenna units 3-1 to 3-n). Further, according to this embodiment, amplification gains different among the antenna units 3-1 to 3-n are set. Thus, a large gain is set in the antenna of small reception power, while a small gain is set in the antenna of large reception power. Accordingly, it is possible to align bit widths of reception digital data (RxDATA) output from the antenna units.

Furthermore, since an input level of the receiver can be controlled within a predetermined range, it is possible to effectively use bit accuracy in digital arithmetic processing. This control is executed before A/D conversion. Thus, it is possible to expand an input dynamic range of the A/D converter 5 in proportion to a gain control range of the gain control amplifier 73.

Sixth Embodiment

Hereinafter, a sixth embodiment of the present invention will be described with reference to FIGS. 17 to 19. The fourth embodiment has been described by way of example of controlling the gain of the amplifier 73 in each of the antenna units 3-1 to 3-n by the gain control unit 70 installed in the base station device 1. According to the fourth embodiment, however, the antenna units 3-1 to 3-n are connected in parallel to the base station device 1. According to the base station system of this embodiment, as in the case of the first embodiment, antenna units 3-1 to 3-n are linearly connected. Then, according to this embodiment, as in the case of the fourth embodiment, gains of amplifiers 73 in the antenna units 3-1 to 3-n are controlled by a gain control unit 70 installed in a base station device 1.

Other components and operations are similar to those of the base station system of the first or fourth embodiment. Thus, components similar to those of the first or fourth embodiment are denoted by similar reference symbols, and description thereof will be omitted. When necessary, reference will be made to FIGS. 2 to 4 and FIGS. 11 to 13.

Figure 17:
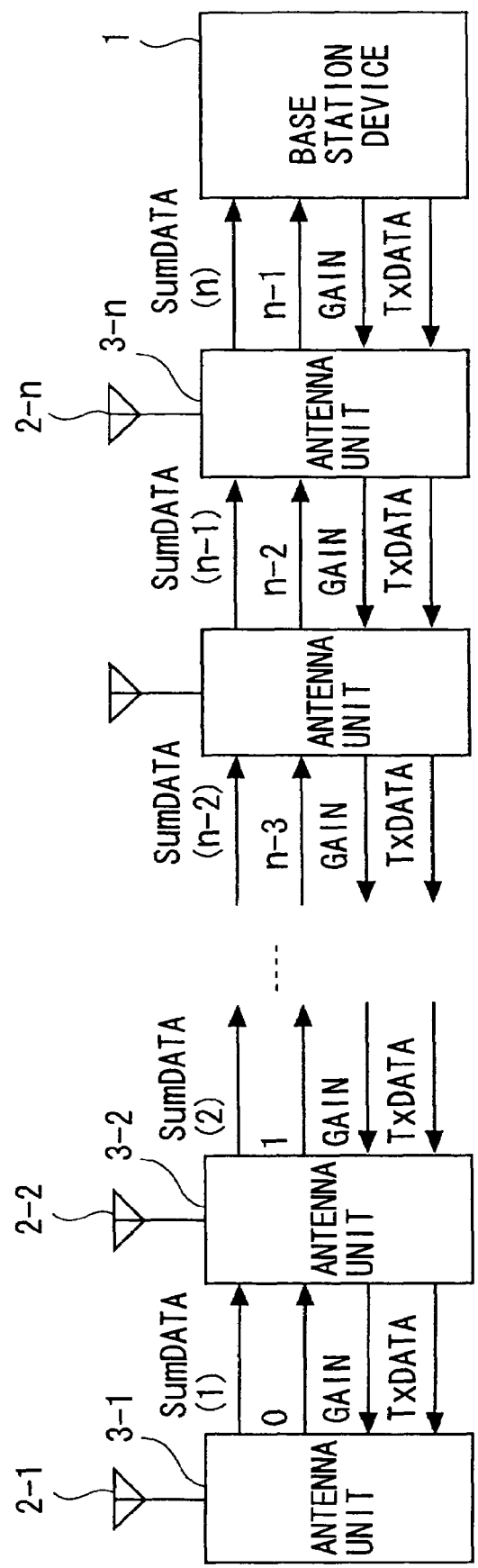
FIG. 17 shows a connection example of antenna units according to a sixth embodiment.

FIG. 17 shows a connection example of the antenna units of this embodiment. According to this embodiment, as in the case of the first embodiment, the antenna units 3-1 to 3-n are linearly connected, and the antenna unit 3-n of one end thereof is connected to the base station device 1.

The antenna units 3-1 to 3-n add and transmit reception digital data (SumDATA(1) to SumDATA(n)) and the numbers of connected antennas (0, . . . n−1) in an uplink direction. The data transmitted in the uplink direction are similar to those of the first embodiment.

On the other hand, the antenna units 3-1 to 3-n transmit gains (Gain) of amplifiers in addition to transmission digital data (RxDATA) in a downlink direction.

Figure 18:
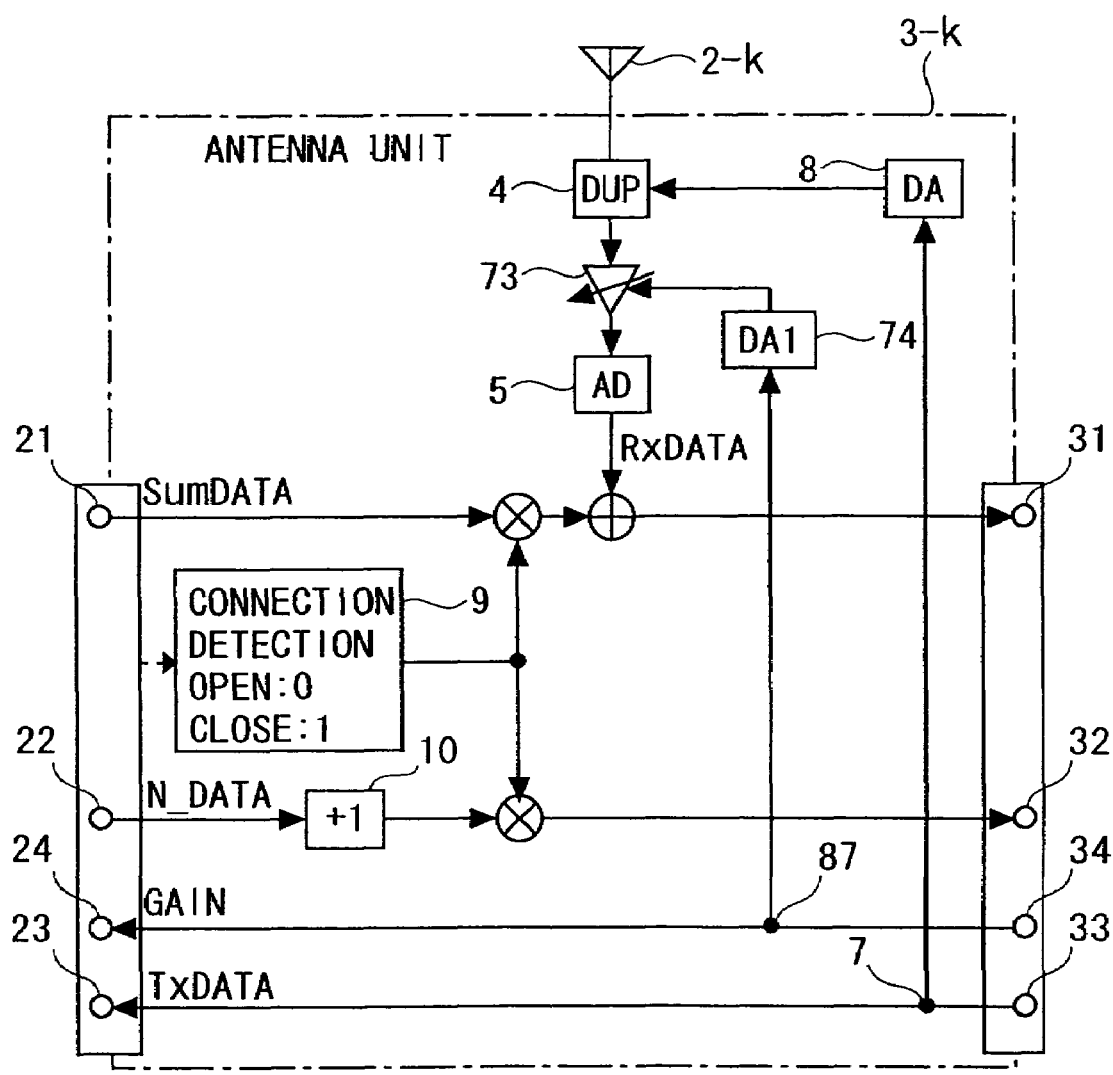
FIG. 18 shows a configuration of the antenna unit according to the sixth embodiment.

FIG. 18 shows a configuration of an antenna unit 3-k. As compared with the first embodiment, the antenna unit 3-k additionally includes an amplifier 73 for amplifying a reception signal, and a D/A converter 74 for setting a gain of the amplifier 73. Further, the antenna unit 3-k additionally includes an input terminal 34 to which an instruction value of a gain input to the D/A converter 74 is input from the uplink direction side, and an output terminal 24 for outputting the instruction value of the gain to the antenna unit 3-(k−1) of the downlink direction side.

Operations of the amplifier 73 and the D/A converter 74 are similar to those of the fourth embodiment (FIG. 12). In other words, the instruction value of the gain is input through the input terminal 34 from the base station device 1.

The D/A converter 74 subjects the input instruction value to D/A conversion, and controls the gain of the amplifier 73. With this configuration, each antenna unit 3-k amplifies a reception signal according to the instruction value of the gain from the base station device 1. The instruction value of the gain is branched by a duplicating unit 87, and further transmitted to the antenna unit 3-(k−1) of the downlink direction side.

Figure 19:
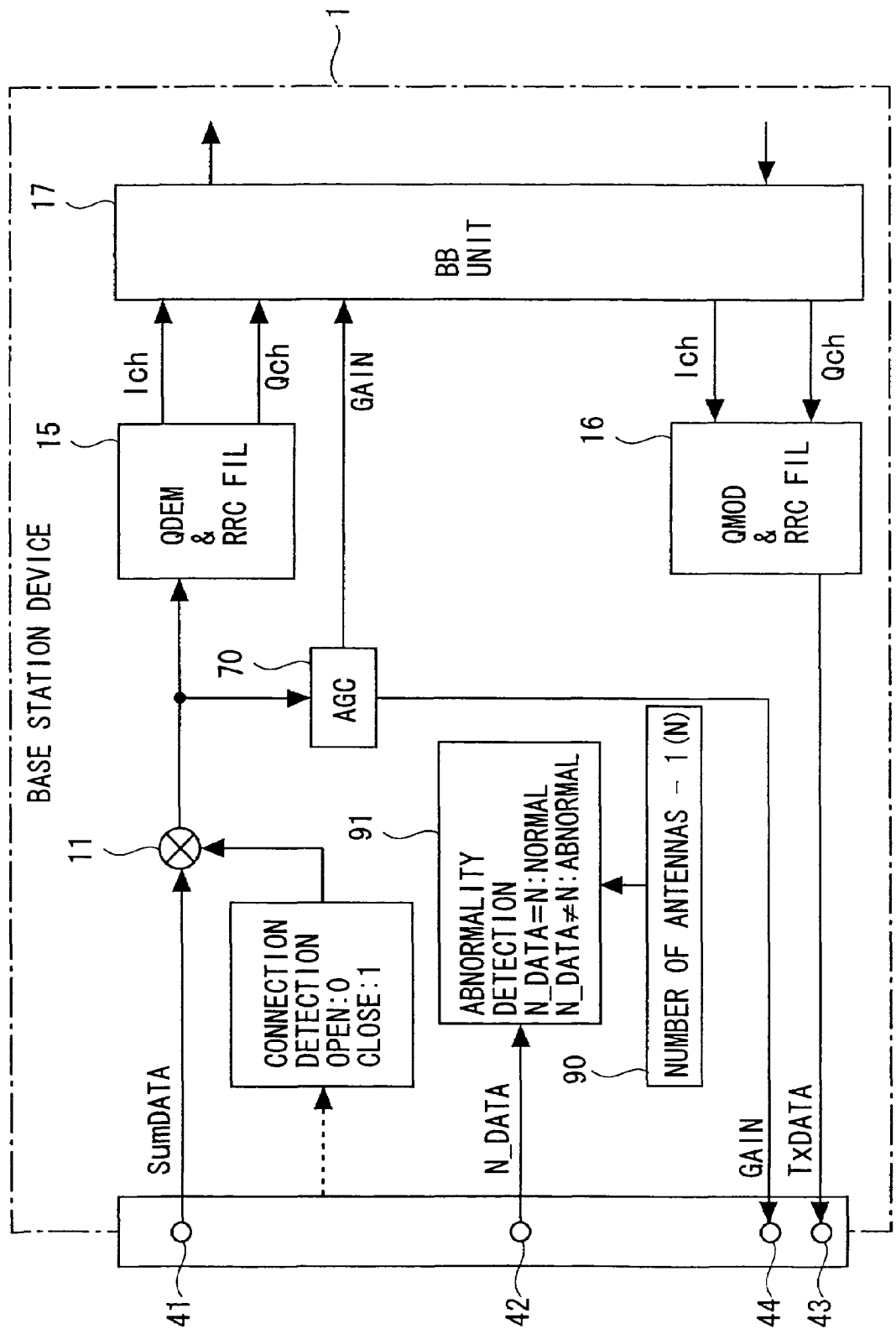
FIG. 19 shows a configuration of a base station device according to the sixth embodiment.

FIG. 19 shows a configuration of the base station device 1 of this embodiment. As shown in FIG. 19, as compared with the first embodiment (FIG. 4), the base station device 1 of this embodiment additionally includes a gain control unit 70.

Further, in the base station device 1, a configuration for calculating an average from the number of connected antennas (N_DATA) (the adder 10 of the number of connected antennas (N_DATA), the computing unit 14 for calculating an inverse number of the number of connected antennas (N_DATA), and the multiplier 13 for multiplying the added digital data SumDATA by the inverse number of the number of connected antennas (N_DATA)) is not provided. In place of such a configuration for calculating an average, the base station device 1 includes a register 90 for holding the number of antenna units, and a determination unit 91 for determining an abnormality of the number of connected antennas (N_DATA).

A configuration and an operation of the gain control unit 70 are similar to those of the fourth embodiment. In other words, the gain control unit 70 calculates reception power based on the reception digital data (SumDATA). Then, the gain control unit 70 calculates a ratio of a target power value with the calculated reception power. Further, the gain control unit 70 instructs the ratio as a power instruction value to the antenna units 3-1 to 3-n.

The amplifiers 73 of the linearly connected antenna units 3-1 to 3-n are controlled based on this power instruction value. With this configuration, according to this embodiment, as in the case of the fourth embodiment, power of the reception digital data input to the quadrature demodulation unit 15 is controlled in the vicinity of target power set by the gain control unit 70. As a result, a bit number of the reception digital data input to the quadrature demodulation unit 15 is controlled within a predetermined range.

That is, according to the base station system of this embodiment, as in the case of the first embodiment, it is possible to suppress power losses from the base station device 1 to the antenna units 3-1 to 3-n. Further, according to the base station system, by installing the antenna units 3-1 to 3-n in desired positions, it is possible to reduce dead zones of mobile communication even in an area of an extremely short reaching distance of an electromagnetic wave. Moreover, according to the base station system, as in the case of the fourth embodiment, it is possible to control an input level of an input signal of the quadrature demodulation unit 15 in the vicinity of the target power.

Furthermore, according to the base station system, an abnormal portion of the antenna unit connection is automatically detected to facilitate maintenance. In other words, by comparing the number of connected antennas (equivalent to the number of operated antenna units) with a proper value (e.g., the number of installed systems), it is possible to detect system abnormalities such as failures of the antenna units.

Seventh Embodiment

Hereinafter, a seventh embodiment of the present invention will be described with reference to FIGS. 20 to 22. According to the sixth embodiment, for the antenna units 3-1 to 3-n linearly connected as in the case of the first embodiment, the gains of the amplifiers 73 are controlled from the base station device 1 as in the case of the fourth embodiment.

According to this embodiment, antenna units 3-1 to 3-n are linearly connected as in the case of the first embodiment. As in the case of the fifth embodiment, a gain control unit 70 for controlling a gain of an amplifier 73 is provided in each of the antenna units 3-1 to 3-n.

Other components and operations are similar to those of the base station system of the first, fourth, fifth or sixth embodiment. Accordingly, components similar to those of the first, fourth, fifth, or sixth embodiment are denoted by similar reference symbols, and description thereof will be omitted. When necessary, reference will be made to FIGS. 2 to 4 and FIGS. 11 to 19.

Figure 20:
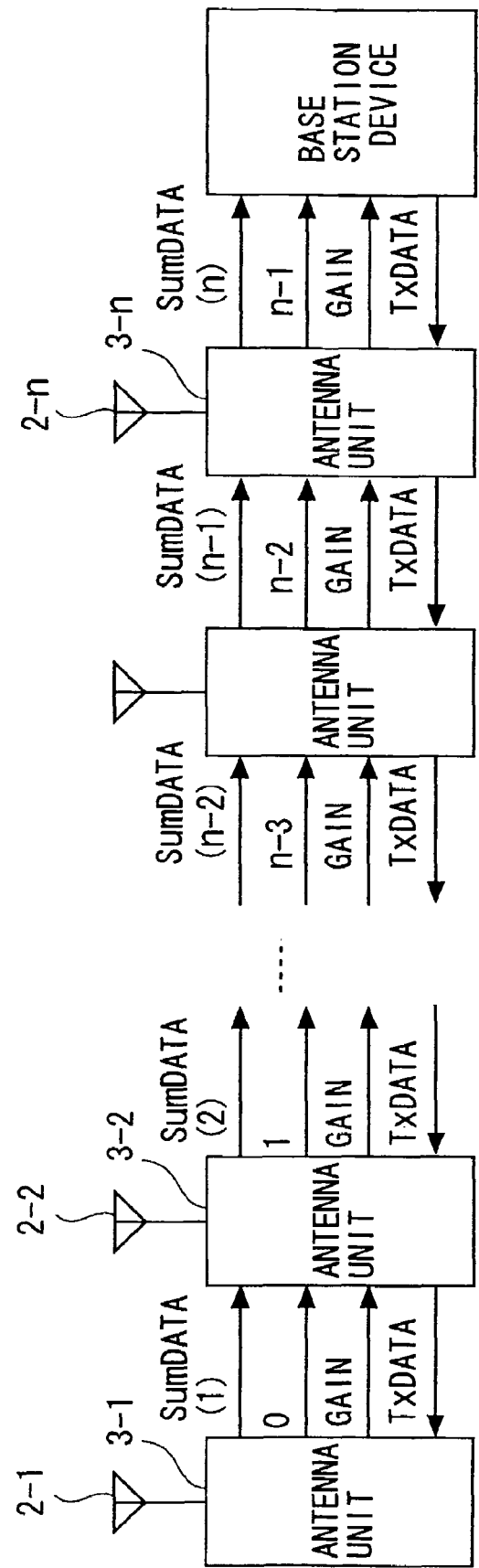
FIG. 20 shows a connection example of antenna units according to a seventh embodiment.

FIG. 20 shows a connection example of the antenna units of this embodiment. Topology of this connection and kinds of signals transmitted to the antenna units are similar to those of the sixth embodiment (FIG. 17). According to this embodiment, however, gains of amplifiers of the antenna units 3-1 to 3-n are controlled therein. Thus, according to this embodiment, the gains of the amplifiers are not transmitted from the base station device 1 to the antenna units 3-1 to 3-n.

According to this embodiment, however, the gains of the amplifiers of the antenna units 3-1 to 3-n are reported to the base station device 1 as in the case of the fifth embodiment. Thus, in the case of FIG. 20, unlike the case of FIG. 17, the gains (shown as Gain in FIG. 20) are transmitted in an uplink direction.

Figure 21:
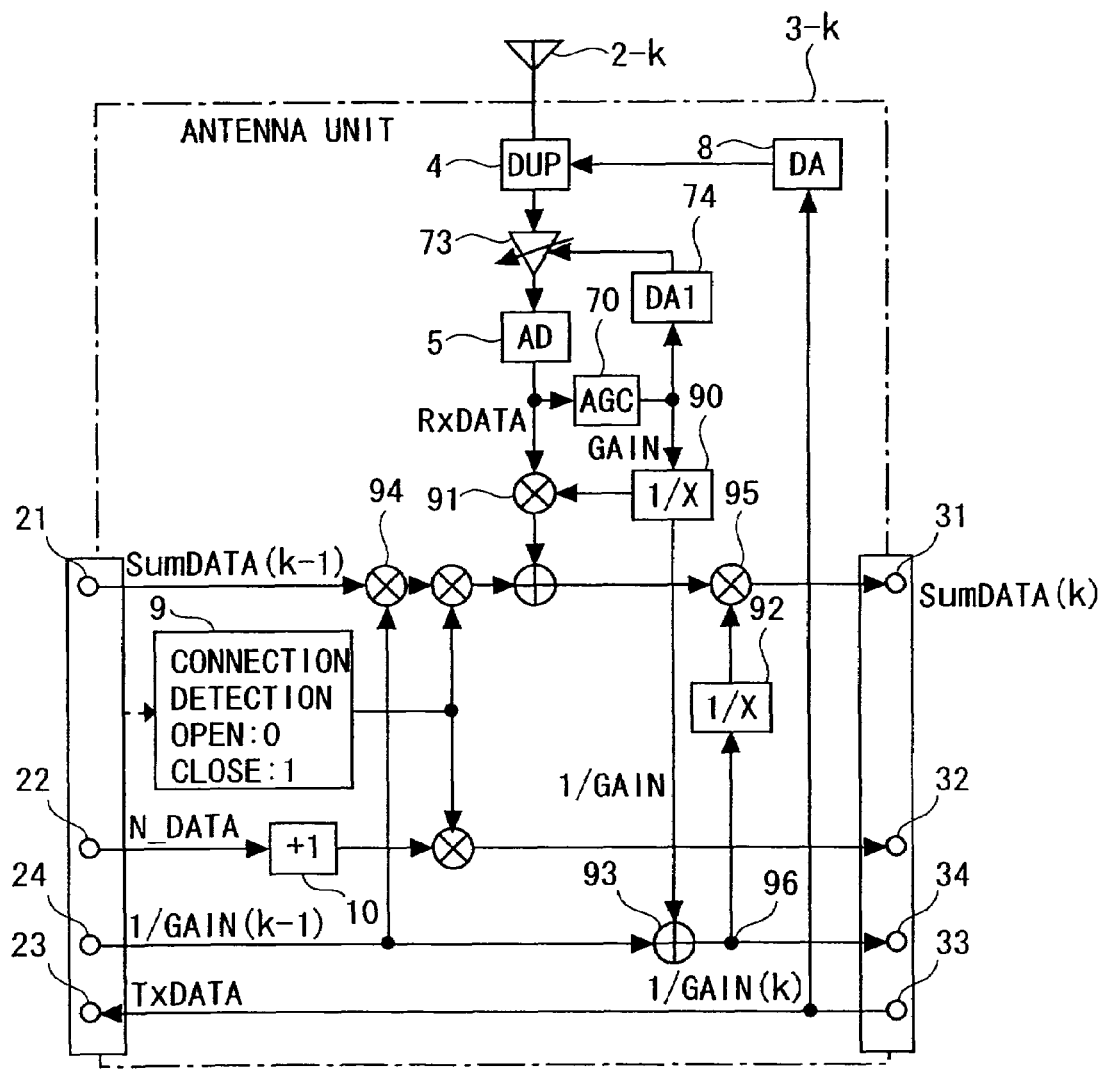
FIG. 21 shows a configuration of the antenna unit according to the seventh embodiment.

FIG. 21 shows a configuration of an antenna unit 3-k of this embodiment. As compared with the sixth embodiment, this antenna unit 3-k additionally includes a gain control unit 70, a computing unit 90 for converting an instruction value of a gain by the gain control unit 70 into an inverse number, a multiplier 91 for multiplying reception digital data (Rx-DATA) by the inverse number of the gain, an adder 93 for adding the inverse number of the gain to an inverse number (1/Gn(k−1)) of a synthesized gain of a downlink direction side to obtain a synthesized value of inverse numbers of gains, and a computing unit 92 for obtaining a synthesized value of the gains from the synthesized value of the inverse numbers of the gains.

A configuration and an operation of the gain control unit 70 are similar to those of the fifth embodiment (FIG. 16).

According to this embodiment, as in the case of the fifth embodiment, the amplifier 73 is controlled by the gain control unit 70. According to this embodiment, however, the reception digital data (RxDATA) amplified by the amplifier 73 and subjected to A/D conversion by the A/D converter 5 is multiplied with the inverse number of the gain by the multiplier 91.

Meanwhile, in the antenna unit 3-k, added digital data (SumDATA(k−1)) is input to an input terminal 21. Additionally, the inverse number (1/Gn(k−1)) of the synthesized value of the gains of the amplifiers 73 up to an adjacent antenna unit 3-(k−1) is input to an input terminal 24.

Then, the added digital data (SumDATA(k−1)) and the inverse number (1/Gn(k−1)) of the synthesized value of the gains are multiplied together by a multiplier 94. As a result, an output of the multiplier 94 becomes added digital data where amplification influences of the amplifiers 73 incorporated in the antenna units 3-1 to 3-(k−1) of the downlink direction side are cancelled.

Then, by the multiplier 91, reception digital data with no amplification influence of the amplifier 73 of the antenna unit 3-k is calculated. This reception digital data is added to the added digital data obtained by addition from the downlink direction side.

In other words, according to this embodiment, the reception data of the antenna units 3-1 to 3-n are subjected to cancellation of amplification influences of the amplifiers 73, and added together to constitute added digital data.

Further, the inverse number (1/Gain(k−1)) of the synthesized value of the gains and an inverse number (1/Gain) of a gain of the amplifier 73 of the antenna unit 3-k are added together by the adder 93. As a result of this addition, an inverse number (1/Gain(k)) of a synthesized value of the gains to which the gain of the amplifier 73 of the antenna unit 3-k has been added is calculated.

The inverse number (1/Gain(k)) of the synthesized value of the gains is branched by a duplicating unit 96, and transmitted to the computing unit 92 and the output terminal 34. The computing unit 92 calculates a synthesized gain (Gain(k)) from the inverse number (1/Gain(k)) of the synthesized value of the gains.

Then, the added digital data is multiplied with the synthesized gain Gain(k) by a multiplier 95. This added digital data (SumDATA(k)) is transmitted to an antenna unit 3-(k+1) of the uplink side or the base station device 1 via an output terminal 31. The inverse number (1/Gain(k)) of the synthesized value of the gains branched by the duplicating unit 96 is transmitted to the antenna unit 3-(k+1) of the uplink side or the base station device 1 via an output terminal 34.

FIG. 22 shows a configuration of the base station device 1 of this embodiment. In this base station device 1, as compared with the sixth embodiment (FIG. 19), a gain control unit 70 is not provided. It is because according to this embodiment, the gain control unit 70 is provided in each of the antenna units 3-1 to 3-n. Additionally, according to this embodiment, the inverse number (1/Gain(n)) of the synthesized gain of the amplifiers 73 of the antenna units 3-1 to 3-n is reported to an input terminal 44. Other components and operations of the base station device 1 are similar to those of the sixth embodiment.

With this configuration, according to the base station system of this embodiment, as in the case of the foregoing first embodiment, it is possible to suppress power losses from the base station device 1 to the antenna units 3-1, . . . , 3-n. According to the base station system of this embodiment, by installing the antenna units 3-1 to 3-n in desired positions, it is possible to reduce dead zones of mobile communication even in an area of an extremely short reaching distance of an electromagnetic wave.

Further, as in the case of the system of the fifth embodiment, the gain is controlled to a target power value in each of the antenna units 3-1 to 3-n. Thus, with the configuration of this embodiment, input power of a quadrature demodulation unit 15 can be controlled to the target power value (e.g., n multiple of the target power value of the antenna units 3-1 to 3-n). Additionally, according to this embodiment, amplification gains different among the antenna units 3-1 to 3-n are set. Thus, a large gain can be set in an antenna of small reception power while a small gain can be set in an antenna of large reception power. Accordingly, it is possible to align bit widths of the reception digital data (RxDATA) output from the antenna units.

According to the base station system, abnormal portions of the antenna units are automatically detected to facilitate maintenance.

OTHER MODIFIED EXAMPLES

According to the first, sixth, and seventh embodiments, the adder 10 is provided in each antenna unit to add the numbers of connected antennas (N_DATA) by units, and the number of antenna units 3-k connected to the base station device 1 is counted. Then, based on the number of connected antenna units (N_DATA) reported from the antenna units, the base station device 1 executes average calculation, and abnormality detection etc. by the connected number. Such a counting mechanism and the base station device 1 may constitute a management device of the antenna units.

For example, the counted number of connected antenna units (N_DATA) can be directly used as a serial number. Thus, it can be used as address appending means of a network of the linearly connected antenna units.

In this case, a mechanism of reporting the number of connected antennas (N-DATA) in each antenna unit to the base station device 1 is necessary. For this purpose, for example, a dedicated line passing through each antenna unit may be provided. Additionally, by using a line for counting the number of connected antenna units (N_DATA) (e.g., line connected to the units 22 and 32 of FIG. 3) in a time-division manner, the number of connected antenna units (N_DATA) in each antenna unit may be reported to the base station device 1.

With this configuration, at the time of connecting a new antenna unit, an address is automatically appended by the counting means (line connected to the adder 10 and the terminals 22 and 32), whereby user's time and labor of manually setting an address can be omitted.

The configurations of the above embodiments can be combined as occasion demands. For example, in the base station system of the sixth or seventh embodiment, as in the case of the third embodiment, an average of reception digital data may be calculated in each antenna unit 3-k. With this configuration, it is possible to suppress an increase in bit number caused by addition of values of the reception digital data.

<<Notes>>

Further, the embodiment disclose the following inventions which are referred as "Notes".

Note 1(8). A multi-antenna system, comprising a plurality of antenna units, a connection unit for connecting the antenna units, and a base station device connected to at least one of the antenna units or the connection unit, wherein:

each antenna unit is combined with the other antenna units connected in a first direction, the other antenna units connected in a second direction, or the connection unit to constitute a multi-antenna, and includes:

a unit value addition unit for adding number information of connected antenna unit input from the first direction by 1 unit;

a connected number sending unit for sending the number information of connected antenna unit having the 1 unit added thereto as number information of connected antenna unit in the second direction;

a transmission/reception module for transmitting/receiving a radio signal;

an analog digital conversion unit for converting the radio signal received from the transmission/reception module into reception digital data;

a reception data addition unit for adding together input digital data input from the first direction and the reception digital data;

an added digital data sending unit for sending the added digital data as input digital data in the second direction;

a digital analog conversion unit for converting transmission digital data input from the second direction into a transmission analog signal;

a feeding unit for feeding power of the transmission analog signal to the transmission/reception module; and a transmission data sending unit for duplicating the transmission digital data input from the second direction and sending the duplicated data in the first direction;

the connection unit includes:

first and second connected units connected to the other antenna units in the first direction;

a third connected unit connected to another connection unit or the base station device in the second direction;

a connected number addition unit for generating an added connected number by adding together number information of connected antenna unit input from the first connected unit and number information of connected antenna unit input from the second connected unit;

a connected number sending unit for sending the added connected number as number information of connected antenna unit in the second direction;

a reception data addition unit for adding together input digital data input from the first connected unit and input digital data input from the second connected unit; and an added digital data sending unit for sending the added input digital data as input digital data in the second direction; and the base station device includes:

computing means for generating a divided value obtained by dividing the input digital data input from the antenna unit by the number information of connected antenna units;

a demodulation unit for demodulating a reception signal from the divided value; and a modulation unit for generating the transmission digital data.

Note 2(9). The multi-antenna system according to Note 1, wherein the connection unit further includes means for clearing the input digital data input from the first connected unit when another antenna unit is not connected to the first connected unit, and means for clearing the input digital data input from the second connected unit when another antenna unit is not connected to the second connected unit.

Note 3(10). The multi-antenna system according to Note 1, wherein the connection unit further includes means for clearing the number information of connected antenna units input from the first connected unit when another antenna unit is not connected to the first connected unit, and means for clearing the number information of connected antenna units input from the second connected unit when another antenna unit is not connected to the second connected unit.

Note 4(11). A multi-antenna system, comprising a plurality of linearly connected antenna units, and a base station device connected to at least one of the antenna units, wherein:

each antenna unit is combined with the other antenna units connected in a first or second direction to constitute a multi-antenna, and includes:

a unit value addition unit for adding number information of connected antenna unit input from the first direction by 1 unit;

a connected number sending unit for sending the number information of connected antenna unit having the 1 unit added thereto as number information of connected antenna unit in the second direction;

a transmission/reception module for transmitting/receiving a radio signal;

an analog digital conversion unit for converting the radio signal received from the transmission/reception module into reception digital data;

a weight averaging unit for weight-averaging an average value of the reception digital data and input digital data from the first direction according to the number of antenna units connected in the first direction;

an average value data sending unit for sending the weight-averaged digital data as input digital data in the second direction;

a digital analog conversion unit for converting transmission digital data input from the second direction into a transmission analog signal;

a feeding unit for feeding power of the transmission analog signal to the transmission/reception module; and a transmission data sending unit for duplicating the transmission digital data input from the second direction and sending the duplicated data in the first direction; and the base station device includes:

a demodulation unit for demodulating a reception signal from the input digital data input from the antenna unit; and a modulation unit for generating the transmission digital data.

Note 5(12). The multi-antenna system according to Note 4, wherein the weight averaging unit includes:

a connected number multiplication unit for generating multiplication data by multiplying the input digital data input from the first direction by the number information of connected antenna unit;

a reception data addition unit for calculating added digital data by adding together the reception digital data and the multiplication data; and a computing unit for dividing the added digital data by the number information of connected antenna unit having the 1 unit added thereto.

Note 6(13). A multi-antenna system, comprising a plurality of antenna units, and a base station device connected to at least one of the antenna units, wherein:

each antenna unit includes:

a transmission/reception module for transmitting/receiving a radio signal;

a gain control amplifier for amplifying the radio signal received from the transmission/reception module by a specified gain;

an analog digital conversion unit for converting the amplified radio signal into reception digital data;

a digital analog conversion unit for converting transmission digital data input from the base station device into a transmission analog signal; and a feeding unit for feeding power of the transmission analog signal to the transmission/reception module; and the base station device includes:

a reception data addition unit for generating added digital data by adding together the input digital data input from the antenna units;

a gain control unit for setting a gain of the gain control amplifier based on a signal level of the added digital data;

a demodulation unit for demodulating a reception signal from the added digital data; and a modulation unit for generating the transmission digital data.

Note 7(14). A multi-antenna system, comprising a plurality of antenna units, and a base station device connected to at least one of the antenna units, wherein:

each antenna unit includes:

a transmission/reception module for transmitting/receiving a radio signal;

a gain control amplifier for amplifying the radio signal received from the transmission/reception module by a specified gain;

an analog digital conversion unit for converting the amplified radio signal into reception digital data;

a gain control unit for setting a gain of the gain control amplifier based on a signal level of the reception digital data;

a gain sending unit for sending data regarding the gain to the base station device;

a digital analog conversion unit for converting transmission digital data input from the base station device into a transmission analog signal; and a feeding unit for feeding power of the transmission analog signal to the transmission/reception module; and the base station device includes:

a reception data input unit for inputting the input digital data from each antenna unit;

a gain data input unit for inputting the data regarding the gain from each antenna unit;

a gain computing unit for dividing the input digital data by a gain of the input origin antenna unit;

a reception data addition unit for generating added digital data by adding together the input digital data divided by the gain and input from the antenna units;

a gain synthesis unit for synthesizing the data regarding the gain input from each antenna unit with data regarding a synthesized gain;

a synthesized gain multiplication unit for multiplying the added digital data by the synthesized gain;

a demodulation unit for demodulating a reception signal from the added digital data multiplied by the synthesized gain; and a modulation unit for generating the transmission digital data.

Note 8(15). A multi-antenna system, comprising a plurality of linearly connected antenna units, and a base station device connected to at least one of the antenna units, wherein each antenna unit is combined with the other antenna units connected in a first or second direction to constitute a multi-antenna, and includes:

a unit value addition unit for adding number information of connected antenna unit input from the first direction by 1 unit;

a connected number sending unit for sending the number information of connected antenna unit having the 1 unit added thereto as number information of connected antenna unit in the second direction;

a transmission/reception module for transmitting/receiving a radio signal;

a gain control amplifier for amplifying the radio signal received from the transmission/reception module by a specified gain;

an analog digital conversion unit for converting the amplified radio signal into reception digital data;

a gain control unit for controlling a gain of the gain control amplifier based on a signal level of the reception digital data;

a gain synthesis unit for synthesizing data regarding the gain with data regarding a synthesized gain from the first direction;

a gain sending unit for sending the synthesized data as data regarding the synthesized gain in the second direction;

a weight averaging unit for weight-averaging an average value of the reception digital data and input digital data from the first direction according to the number of antenna units connected in the first direction;

an average digital data sending unit for sending the weight-averaged digital data as input digital data in the second direction;

a digital analog conversion unit for converting transmission digital data input from the second direction into a transmission analog signal;

a feeding unit for feeding power of the transmission analog signal to the transmission/reception module; and a transmission data sending unit for duplicating the transmission digital data input from the second direction and sending the duplicated data in the first direction.

Note 9(16). The multi-antenna system according to Note 8, wherein the weight averaging unit includes:

a gain computing unit for dividing the reception digital data by the gain;

a synthesized gain computing unit for dividing the input digital data input from the first direction by the synthesized gain from the first direction;

a connected number multiplication unit for generating multiplication data by multiplying the input digital data divided by the synthesized gain from the first direction by the number information of connected antenna unit input from the first direction;

a reception data addition unit for calculating added digital data by adding together the reception digital data divided by the gain and the multiplication data;

a computing unit for dividing the added digital data by the number information of connected antenna unit having the 1 unit added thereto; and a synthesized gain multiplication unit for multiplying the divided added digital data by the data regarding the synthesized gain of the second direction.

Note 10(21). An antenna unit provided in a radio base station device, and combined with another antenna unit connected in a first or second direction to constitute a multi-antenna, comprising:

a unit value addition unit for adding number information of connected antenna unit input from the first direction by 1 unit;

a connected number sending unit for sending the number information of connected antenna unit having the 1 unit added thereto as number information of connected antenna unit in the second direction;

a transmission/reception module for transmitting/receiving a radio signal;

an analog digital conversion unit for converting the radio signal received from the transmission/reception module into reception digital data;

a weight averaging unit for weight-averaging an average value of the reception digital data and input digital data from the first direction according to the number of antenna units connected in the first direction;

an average value data sending unit for sending the weight-averaged digital data as input digital data in the second direction;

a digital analog conversion unit for converting transmission digital data input from the second direction into a transmission analog signal;

a feeding unit for feeding power of the transmission analog signal to the transmission/reception module; and a transmission data sending unit for duplicating the transmission digital data input from the second direction and sending the duplicated data in the first direction.

Note 11(22). The antenna unit according to Note 10, wherein the weight averaging unit includes:

a connected number multiplication unit for generating multiplication data by multiplying the input digital data input from the first direction by the number information of connected antenna unit;

a reception data addition unit for calculating added digital data by adding together the reception digital data and the multiplication data; and a computing unit for dividing the added digital data by the number information of connected antenna unit having the 1 unit added thereto.

Note 12(23). An antenna unit provided in a radio base station apparatus, and combined with another antenna unit connected in a first or second direction to constitute a multi-antenna, comprising:

a unit value addition unit for adding number information of connected antenna unit input from the first direction by 1 unit;

a connected number sending unit for sending the number information of connected antenna unit having the 1 unit added thereto as number information of connected antenna unit in the second direction;

a transmission/reception module for transmitting/receiving a radio signal;

a gain control amplifier for amplifying the radio signal received from the transmission/reception module by a specified gain;

an analog digital conversion unit for converting the amplified radio signal into reception digital data;

a gain control unit for controlling a gain of the gain control amplifier based on a signal level of the reception digital data;

a gain synthesis unit for synthesizing data regarding the gain with data regarding a synthesized gain from the first direction;

a gain sending unit for sending the synthesized data as data regarding the synthesized gain in the second direction;

a weight averaging unit for weight-averaging an average value of the reception digital data and input digital data from the first direction according to the number of antenna units connected in the first direction;

an average digital data sending unit for sending the weight-averaged digital data as input digital data in the second direction;

a digital analog conversion unit for converting transmission digital data input from the second direction into a transmission analog signal;

a feeding unit for feeding power of the transmission analog signal to the transmission/reception module; and a transmission data sending unit for duplicating the transmission digital data input from the second direction and sending the duplicated data in the first direction.

Note 13(24). The antenna unit according to Note 12, wherein the weight averaging unit includes:

a gain computing unit for dividing the reception digital data by the gain;

a synthesized gain computing unit for dividing the input digital data input from the first direction by the synthesized gain from the first direction;

a connected number multiplication unit for generating multiplication data by multiplying the input digital data divided by the synthesized gain from the first direction by the number information of connected antenna unit input from the first direction;

a reception data addition unit for calculating added digital data by adding together the reception digital data divided by the gain and the multiplication data;

a computing unit for dividing the added digital data by the number information of connected antenna unit having the 1 unit added thereto; and a synthesized gain multiplication unit for multiplying the divided added digital data by the data regarding the synthesized gain of the second direction.

Note 14(25). A base station device linked with antenna units each including a gain control amplifier for controlling a radio signal received from a transmission/reception module by a specified gain, the based station device comprising:

a reception data addition unit for generating added digital data by adding together input digital data input from the antenna units;

a gain control unit for setting a gain of the gain control amplifier based on a signal level of the added digital data;

a demodulation unit for demodulating a reception signal from the added digital data; and a modulation unit for generating the transmission digital data.

Note 15(26). An information system management apparatus, comprising a plurality of linearly connected processing devices, and a control device connected to at least one of the processing devices, wherein:

each processing device is combined with the other processing devices connected in a first or second direction to constitute an information system, and includes:
a unit value addition unit for adding processing device connected number information input from the first direction by 1 unit; and
a connected number sending unit for sending the processing device connected number information having the 1 unit added thereto as processing device connected number information in the second direction; and
the control device includes means for inputting the number of connected processing devices.

Note 16(27). A data transmission/reception method of transmitting/receiving data by an antenna unit combined with another antenna unit connected in a first or second direction to constitute a multi-antenna, and a base station,
the method executing in each antenna unit:
a step of adding number information of connected antenna unit input from the first direction by 1 unit;
a step of sending the number information of connected antenna unit having the 1 unit added thereto as number information of connected antenna unit in the second direction;
a step of converting a received radio signal into reception digital data;
a step of adding together input digital data input from the first direction and the reception digital data;
a step of sending the added digital data as input digital data in the second direction;
a step of converting transmission digital data input from the second direction into a transmission analog signal;
a step of transmitting the transmission analog signal; and
a step of duplicating the transmission digital data input from the second direction and sending the duplicated data in the first direction; and
the method executing in the base station device:
a step of generating a divided value by dividing the input digital value input from the antenna unit by the number information of connected antenna units;
a step of demodulating a reception signal from the divided value; and
a step of generating the transmission digital data.

Note 17(29). A radio base station, comprising:
a plurality of serially connected antennas;
addition means for digitally adding together a reception signal from an antenna of a front stage and a reception signal from an own antenna and supplying the added signal to an antenna of a rear stage;
calculation means for calculating the number of added antennas; and
computing means for compressing a range of a sum total of the reception signals added together by the addition means according to the calculated number of antennas.

INDUSTRIAL APPLICABILITY

The present invention can be used for a radio communication system, in particular, a mobile communication system where electromagnetic wave dead zones are easily generated.

What is claimed is:
1. A multi-antenna system, comprising a plurality of linearly connected antenna units, and a base station device connected to at least one of the antenna units, wherein:
each antenna unit is combined with the other antenna units connected in a first or second direction to constitute a multi-antenna, and includes:
a unit value addition unit adding number information of connected antenna unit input from the first direction by 1 unit;
a connected number sending unit sending the number information of connected antenna unit having the 1 unit added thereto as number information of connected antenna unit in the second direction;
a transmission/reception module transmitting/receiving a radio signal;
an analog digital conversion unit convening the radio signal received from the transmission/reception module into reception digital data;
a reception data addition unit adding together input digital data input from the first direction and the reception digital data;
an added digital data sending unit sending the added digital data as input digital data in the second direction;
a digital analog conversion unit convening transmission digital data input from the second direction into a transmission analog signal;
a feeding unit feeding power of the transmission analog signal to the transmission/reception module; and
a transmission data sending unit duplicating the transmission digital data input from the second direction and sending the duplicated data in the first direction; and
the base station device includes:
a computing unit generating a divided value obtained by dividing the input digital data input from the antenna unit by the number information of connected antenna units;
a demodulation unit demodulating a reception signal from the divided value; and
a modulation unit generating the transmission digital data.

2. The multi-antenna system according to claim 1, wherein the antenna unit further includes:
a gain control amplifier amplifying the radio signal received from the transmission/reception module by a specified gain;
a gain data input unit inputting data regarding the gain from the second direction; and
a gain data sending unit duplicating the data regarding the gain and sending the duplicated data in the first direction.

3. The multi-antenna system according to claim 1, wherein the antenna unit further includes a unit clearing the input digital data input from the first direction when the antenna unit is not connected to another antenna unit in the first direction.

4. The multi-antenna system according to claim 1, wherein the antenna unit further includes a unit clearing the number information of connected antenna unit input from the first direction when the antenna unit is not connected to another antenna unit in the first direction.

5. The multi-antenna system according to claim 1, wherein the base station device further includes a unit clearing the input digital data input from the antenna unit when the base station device is not connected to the antenna unit.

6. The multi-antenna system according to claim 1, wherein the base station device further includes a unit clearing the number information of connected antenna unit input from the antenna unit when the base station device is not connected to the antenna unit.

7. The multi-antenna system according to claim 1, wherein the base station device further includes an abnormality detection unit detecting abnormalities of the connected antenna units based on the number information of connected antenna unit.

8. An antenna unit provided in a radio base station device, and combined with another antenna unit connected in a first or second direction to constitute a multi-antenna, comprising:
- a unit value addition unit adding number information of connected antenna unit input from the first direction by 1 unit;
- a connected number sending unit sending the number information of connected antenna unit having the 1 unit added thereto as number information of connected antenna unit in the second direction;
- a transmission/reception module transmitting/receiving a radio signal;
- an analog digital conversion unit converting the radio signal received from the transmission/reception module into reception digital data;
- a reception data addition unit adding together input digital data input from the first direction and the reception digital data;
- an added digital data sending unit sending the added digital data as input digital data in the second direction;
- a digital analog conversion unit converting transmission digital data input from the second direction into a transmission analog signal;
- a feeding unit feeding power of the transmission analog signal to the transmission/reception module; and
- a transmission data sending unit duplicating the transmission digital data input from the second direction and sending the duplicated data in the first direction.

9. The antenna unit according to claim 8, further comprising:
- a gain control amplifier amplifying the radio signal received from the transmission/reception module by a specified gain;
- a gain data input unit inputting data regarding the gain from the second direction; and
- a gain data sending unit duplicating the data regarding the gain and sending the duplicated data in the first direction.

10. The antenna unit according to claim 8, further comprising a unit clearing the input digital data input from the first direction when the antenna unit is not connected to another antenna unit in the first direction.

11. The antenna unit according to claim 8, further comprising a unit clearing the number information of connected antenna unit input from the first direction when the antenna unit is not connected to another antenna unit in the first direction.

12. A radio base station comprising:
- a unit digitally adding together reception signals of a plurality of antennas;
- a calculation unit calculating the number of antennas to be added by executing an arithmetic operation according to the digital added value;
- a computing unit generating a divided value obtained by dividing the reception signals added together by the number information of connected antenna units; and
- a demodulation unit demodulating a reception signal by using the divided value.

* * * * *